(12) United States Patent
Plutowski

(10) Patent No.: US 6,473,851 B1
(45) Date of Patent: Oct. 29, 2002

(54) SYSTEM FOR COMBINING PLURALITY OF INPUT CONTROL POLICIES TO PROVIDE A COMPOSITIONAL OUTPUT CONTROL POLICY

(76) Inventor: Mark E Plutowski, 4881 Branciforte Dr., Santa Cruz, CA (US) 95065-9621

( * ) Notice: Subject to any disclaimer, the term of this patent is extended or adjusted under 35 U.S.C. 154(b) by 0 days.

(21) Appl. No.: 09/268,482

(22) Filed: Mar. 11, 1999

(51) Int. Cl.[7] .............................. G06F 9/00; G06F 15/18
(52) U.S. Cl. ..................... 713/1; 706/1; 706/5; 706/15; 706/47
(58) Field of Search .................. 713/1; 706/1, 47, 706/5, 15, 16, 45

(56) References Cited

U.S. PATENT DOCUMENTS

| | | | | |
|---|---|---|---|---|
| 5,559,933 A | * | 9/1996 | Boswell | 358/1.15 |
| 5,933,503 A | * | 8/1999 | Schell et al. | 713/187 |
| 6,052,723 A | * | 4/2000 | Ginn | 709/223 |
| 6,205,477 B1 | * | 3/2001 | Johnson et al. | 709/220 |
| 6,249,780 B1 | * | 6/2001 | Mizokawa | 706/23 |
| 6,329,986 B1 | * | 12/2001 | Cheng | 345/419 |

* cited by examiner

Primary Examiner—Thomas Lee
Assistant Examiner—Thuan Du

(57) ABSTRACT

Method and apparatus for combining a plurality of overlapping policy-based controllers. System also applicable to policy-based process servers. System combines controllers by combining the respective policy information. System combines a plurality of policy-based sub-controllers by combining the associated distributional information contained in the associated sub-policies. An iterative mixture mechanism with temporal persistence regulates the relative contribution of the sub-policies smoothly over time thereby allowing smooth transition of control from one control regime to another. The system provides for modular detection and resolution of conflicts that may arise as a result of combining otherwise incompatible sub-policies. Preferred embodiment performs mixture method in policy space. Another embodiment applies mixture method to value functions associated with each sub-server.

24 Claims, 24 Drawing Sheets

601

Schema of Policy Specification Table: PolicyId, PolicyType
where valid PolicyType's are {fuzzy, stochastic},
and valid PolicyId's are {1,2,...,v}

602

Schema of Policy Table: PolicyId, ActionId, ActionWeight,
where ActionId is in {1,2,...,#A},
and ActionWeight is a real-valued number taking values in [0,1] if PolicyType is "stochastic" and otherwise takes any floating point value.

603

Schema of Action Table: ActionId, ActionSpecifier
where ActionId is in {1,2,...,#A},
and ActionSpecifier is a code that specifies the action attributes or provides an index into a table that contains this information.

FIGURE 6

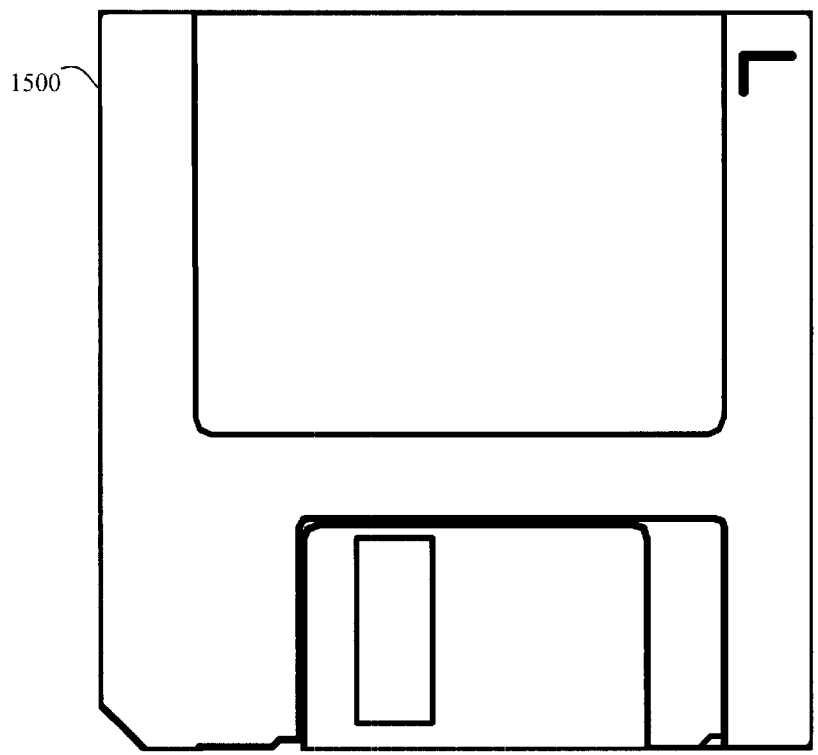
FIGURE 15: a perspective view of an exemplary signal-bearing medium in accordance with one embodiment of the invention.

SYSTEM FOR COMBINING PLURALITY OF INPUT CONTROL POLICIES TO PROVIDE A COMPOSITIONAL OUTPUT CONTROL POLICY

BACKGROUND OF THE INVENTION

1. Field of Invention

The present invention generally relates to policy-based controllers and policy-based process servers.

2. Background—Discussion of Prior Art

This section puts the invention into its proper context. We provide a cursory background and define required terminology. Readers unfamiliar with stochastic control, reinforcement learning, or optimal process control may find the next several subsections helpful in defining the fundamental underlying technologies. Readers very familiar with these topics should at least skim these sections to review general terminology.

A. Scope of Applicability and Main Concepts

This invention is closely related to technologies of Stochastic Control and Reinforcement Learning. Control systems technology is rather well-developed and has numerous sub-areas. Because of this the reader may be accustomed to different terminology to refer to the concepts used here. The terminology we use is in line with definitions employed in [Kaelbling Littman and Moore 1996] and [Sutton and Barto 1998], which provide background survey information, tutorial treatment, precise definitions of technical concepts discussed here, and as well as a clear explanation of the prior art.

Any concepts that are not standard fare in these references are defined here in order to provide a self-contained description. We try to introduce a bare minimum of technical jargon. Crucial technical definitions are formalized using mathematical notation in the sections titled "Formal Definition of Prior Art" and "Formal Definition of the Mixture of Policies Framework."

1. Separation of Policy and Execution

In the technical jargon of control theory, the mapping of a stimulus to a set of action tendencies is referred to as a "policy." Given a set of candidate actions and a stimulus, a policy is a function that recommends one or more actions in response to the given stimulus. Stochastic Control pertains to the technology of using a stochastic policy to controlling action selection processes. FIGS. 1A and 1B illustrate examples of policies. An action selection module then uses a policy to guide its selection of the action or actions from the permissible set of candidate actions. Some control mechanisms specified in the prior art do not separate policy from execution, but here we do. The essential concepts remain whether or not the execution mechanism is inextricably intertwined with the policy data structure or separated as is the case here. The policy "recommends" actions, the action selection module "executes" one or more actions according to this recommendation. This execution mechanism can be straightforward, such as the greedy method of always selecting the highest ranked action. Or it can be more involved, such for example additional checks are made to determine whether an action will conflict with other ongoing actions before triggering it. (See the tutorial references [Kaelbling Littman and Moore 1996] and [Sutton and Barto 1998] for more discussion of how to convert policy information into action selection procedures.)

2. Controllers can Trigger "Actions" as well as "Procedures"

Although we speak about "actions" and "action selection," the controllers described in this document can also regulate procedures. Therefore, an "action selection module" as defined here can control (a) instantaneous actions, (b) ballistic (non-interruptible and non-modifiable) action sequences, but can also regulate (c) ongoing physical processes or (d) branching procedures.

Actions controlled or initiated by a policy can be

1. Momentary or instantaneous: e.g., flash a light bulb, flip a switch.
2. Continuous: e.g., gradually increment the temperature of a furnace over time.
3. Procedural: initiate a multiple step and possibly branching computer program.

Furthermore, actions can be

1. Discrete: e.g. a database containing a finite set of actions indexed by an integer record pointer. An example of this is an web-based ad server for the purpose of displaying a particular ad targeted at a website visitor.
2. Continuous: e.g., a possibly multidimensional control signal indexed by a point within a Euclidean vector space, such as an electronic control system. An example of this is an electronic vacuum pressure regulator inside an automobile.

We refer to actions for simplicity but without loss of generality because an action can mean triggering a procedure, parameterizing the initial state of a procedure, or modifying state information used by an ongoing procedure.

3. Compatible with Reinforcement Learning Technologies

Although this invention does not provide new technology for learning per se all the policy and control mechanisms described here are compatible with the general framework of reinforcement learning theory. As is apparent from the prior art, the general approach used here (i.e., encapsulation and modularization of the data structures and mechanisms involved in formulating policy and executing policy) reduce the computational burden of obtaining policy information. Various statistical, computational, and programming technologies can be applied to obtain a policy. These technologies are well developed and include a wide variety of computational, statistical, and electronic methods. Methods for obtaining or refining policy include (a) explicit programming, (b) direct computation, (c) evolutionary design, (d) evolutionary programming, (e) computerized discovery over historical data stores, (f) computerized statistical inference over historical data stores, (f) computerized real-time direct search, and (g) real-time reinforcement learning. See [Kaelbling Littman and Moore 1996] and [Sutton and Barto 1998] for a review and additional references.

A policy can be

1. Probabilistic: actions are weighted by a probability distribution over the action database. In this case the action selection module picks one action at random drawn according to this distribution. See for instance FIG. 1A.
2. Deterministic: only a single action is recommended. See for instance FIG 1B.

The field of Reinforcement Learning provides technologies for systematically learning, discovering, or evolving policies suitable for stochastic control. Reinforcement learning theory is a fairly mature technology. The field of Fuzzy Control modifies this functionality to allow the following:

3. Fuzzy Membership Assignment: a distribution (possibly non-probabilistic) is applied over the actions in the action database. See FIG 1C.

Given a fuzzy policy the action selection module simultaneously applies one or more of the actions. Therefore, fuzzy control as defined here allows multiple actions to be triggered in parallel. Moreover the action selection mechanism may also utilize the weighting specified by the distribution to initialize parameters of each action. See for instance FIG 1C.

The definition of Fuzzy Policy we use here may be inconsistent with definitions used in prior art, and is not included in the tutorial treatment explained in [Kaelbling Littman and Moore 1996] and [Sutton and Barto 1998], which concentrate exclusively on stochastic control. However, Fuzzy Policy as defined here is related to "fuzzy sets" in that they both specify "degree of membership" rather than "probability." Fuzzy Policy as defined here also allows more than one action to be selected in parallel by the action selection mechanism, whereas a stochastic policy expects only a single action to be selected at one moment in time.

4. A Policy is a Mulit-valued "Recommendation," a Value Function is a "Ranking"

Closely related to the notion of "policy" is the "value function." Rather than a probabilistic distribution over the action database, a value function assigns a numerical weight to each action. A policy formulation mechanism then converts this value function into a policy. What we define as a "fuzzy policy" suffices for representing value functions. Therefore, we can manipulate value functions by treating them as Fuzzy Policies.

Technology for converting a single value function into a policy is standard fare in prior art cited here. However, prior art does not address the combination of multiple value functions (see FIG 1G) or the simultaneous collapse of multiple value functions into a single stochastic policy (see FIG. 1I), or the convergence of multiple stochastic policies in order to obtain a new value function (see FIG 1H).

5. General Applicability and Specific Practical Advantages

This invention is generally compatible with the technologies of reinforcement learning, stochastic control, and fuzzy control. Therefore it has broad scope because of the broad scope of these technologies. These wide-ranging technologies can be used to leverage this invention in a wide variety of ways. Despite the wide-ranging theoretical applicability of these technologies they have limits in certain practical applications. The next section homes in those limitations that are relevant to this invention.

B. Brief Overview of Prior Art

For comprehensive survey or tutorial treatment see [Kaelbling Littman and Moore 1996] or [Sutton and Barto 1998]. We proceed directly to discussing the currently most advanced technology upon which this invention serves to improve.

One of the key constraints upon efficient execution of stochastic control is the computational complexity of the policy information. For background see especially the discussion on compact mappings in the tutorial references [Kaelbling Littman and Moore 1996] and [Sutton and Barto 1998]. However, compact mappings do not completely alleviate the computational cost of learning and executing complex policies. Although a compact map does provide size and speed advantages over a method relying upon less compact data structures, even this approach will rapidly be overwhelmed by the complexity of common practical tasks. Additional efficiencies can be gained by breaking down a policy into modular sub-components. The "gated policy" approach splits the policy into a set of sub-policies and uses a gating mechanism to select from among the sub-policies. This approach has numerous variations and encapsulates numerous complexities that are not exhaustively described here; however, a simple high-level illustration of the essential features of the general approach relevant to this invention is depicted in FIG 1D.

Given a stimulus s, this "gated policy" mechanism selects the sub-policy appropriate for the stimulus at hand, passing that policy through to an action selection module, which then executes that sub-policy upon the given stimulus. "Stimulus" as defined here is quite general, encompassing external sensory stimuli as well as state space accessed within internal memory.

The gated policy approach can make executing or learning stochastic policy information more efficient. It streamlines the acquisition of policy, say, by computerized discovery, exhaustive search, reinforcement learning, or iterative evolution. This is because sub-policies may be more easily obtained individually than can a single monolithic policy. It also streamlines the subsequent refinement of a complex control policy by allowing "learning" to occur hierarchically at multiple levels of description. (Note that while FIG 1D depicts a single level of sub-policies the method can be applied to each of the sub-policies to generate an additional level in the hierarchy, and this decomposition can be applied repeatedly to obtain a hierarchy with multiple levels.) The modular policy approach also streamlines the execution of policy, because multiple simpler sub-policies can replace a complex monolithic policy. It also allows policies stored in different data structures to be combined (e.g., compact maps, database tables, decision trees, procedural code). Therefore, this general approach of "divide-and-conquer" has numerous valuable benefits. Methods that can make efficient use of modular policies have several practical advantages over methods that wield a monolithic policy.

C. Formal Definition of Prior Art

Here we formalize the concepts introduced above.

Current implementations of process controllers typically employ a single method for defining policy (e.g., rules-based, or statistical, but not both). Current technologies based upon a purely rules-based approach can require a large number of rules that take up much space and are costly to evaluate in real-time. Current applications of machine learning and datamining embedded in commercially available process controllers are good for operating on some types of data but limited upon others. (E.g., a web-based personalization server based upon collaborative filtering is good for inferring preference based upon on-site browsing behavior but may be much less useful for deducing preference from an explicit profile provided via questionnaire.) Also, machine learning methods are great for learning from example, but are also largely limited to learning from example—users often need more direct control of the process controller, e.g. by encoding certain rules of behavior explicitly. Therefore, different tasks call for different control strategies, and different control strategies call for different data structures storing policy information, and different strategies for obtaining or refining that policy information.

Even though there are numerous types of data structures for encoding policy information these types can be unified within a single general framework using concepts from reinforcement learning. The reinforcement learning terminology we employ here equates "agent" with "process controller" or "process server" so we will refer to an "agent" henceforth instead of "controller." The concept of "agent" is also more general than the term "controller," and is more appropriate for the computational server applications being emphasized here.

Consider an "agent" located in an environment. The agent's "environmental state" or, "stimulus" is a (possibly highly processed) version of the environment "external" to the agent. Therefore, whereas (in typical usage of the term) a "controller" reacts to sensory information directly or subsequent to some numerical processing, an "agent" can react to highly processed information. The agent's external sensors and internal state memory define this stimulus state, which we model as a d-dimensional real-valued vector space:

$$S \subset \Re^d, d \in \aleph^+.$$

This state could, for example, be the onsite behavior of a website shopper, such as shopping basket contents or page view sequence. Or it could be based upon statistics inferred from historical memory of past purchases by that shopper. In this example the candidate actions each could select a single product recommendation from among a large set of available products, or sort a list of product recommendations in a particular way, or display a link to a particular page. Alternatively, this state could be the stimulus experienced by a robotic toy doll, and the candidate actions each select an appropriate facial expression and body pose in reaction to that stimulus.

For simplicity, we will take the set of available actions to be a discrete set of r actions for some integer r:

$$A = \{a_1, a_2, \ldots, a_r\}.$$

Each action $a \in A$ is a pointer into a database of r procedural routines. $A(s) \subset A$ gives the actions available while in state $s \in S$.

Continuous action spaces are useful for some applications, but are not necessary to illustrate the main concepts being described here. For clarity we introduce the main concepts using discrete action spaces. It is straightforward to extend these concepts to continuous action spaces and the mechanisms for doing so are rather obvious to the informed technologist by drawing upon references such as [Kaelbling Littman and Moore 19961 or [Sutton and Barto 1998] for guidance.

Consider a sequence of stimuli $s_1, s_2, s_3, \ldots$. For each $t=1,2,\ldots$, a "policy" $\pi$ applies a linear order to the set of actions available for responding to stimuli $s_t$. Above we briefly mentioned the distinction between a value function and a policy—the tutorial texts referenced above describe this distinction very clearly. Ultimately the value function must be converted to a policy when applied to action selection and so controllers based upon the modular policy approach commonly apply the modularity within "policy space" rather than in "value function space." However, one embodiment of this invention (described in the specification and claims provided below) is suitable for combining policy information in "value function space." For clarity in explanation and simpler notation we confine our description to "policy space." Upon recognizing the drawbacks of prior art and the specific advantages of this invention, a reasonably capable expert can easily extend this method to apply to value functions without requiring any insights that are not obvious from reading this document or from the prior art cited here.

Intuitively, a policy can be said to model a set of "behaviors," or "action tendencies." A policy can be deterministic (say, choose the highest ranked action as indicated by a value function) or stochastic (i.e., select one of the actions probabilistically). A stochastic policy implements the mapping:

$$\pi : S \times A \to [0,1],$$

for state $s_t \subset S_t$ at time t choosing action $a_t$ with probability $$\pi_t(s,a) = P[a_t = a | s_t = s].$$

A static stochastic policy is one where no adaptation occurs over time such that $\pi_t(s,a) = \pi(s,a)$, $t=1,2,\ldots$. First, we consider a policy that is not modified by learning over previous actions during the lifetime of the agent. For stimulus state $s \subset S$ at time t and action $a \subset A$, static stochastic policy $\pi_t$ sets the probability with which action a is chosen to $$P[a_t = a | s_t = s] = \pi_t(s,a),$$

Note that stochastic control subsumes deterministic control; therefore, this type of policy can implement deterministic behaviors (e.g., via simple rules or procedural script). A number of ways exist to compose an action selection rule from a policy which we omit here for brevity (case studies are provided in [Sutton and Barto, 1998] and [Kaelbling, Littman, and Moore, 1996]). Additional details for converting policy to action selection and for learning or evolving policy are omitted because the essentials of this patent are focused mainly within policy formulation and combination and these details are easily obtained from the references to prior art cited here. Intuitively, a policy ranks the list of candidate actions from which action selection thereby selects a single action function according to that ranking.

Fuzzy controllers as defined here can trigger multiple actions in parallel. Also, because a "fuzzy policy" as defined here is a non-probabilistic distribution, a fuzzy policy formally subsumes stochastic policy. But we describe the prior art involving the triggering of single actions under the stochastic framework for several reasons. (a) It is often quite straightforward to reduce the simultaneous triggering of multiple actions into the framework of single actions. (b) Stochastic control is more familiar to experts and practitioners of intelligent control technologies. (c) It is easier to describe the general mechanism by considering the special case of stochastic control than if we attempt to retain full generality throughout the entire discussion. Upon recognizing the drawbacks of prior art and the specific advantages of this invention, a reasonably capable expert can easily extend this method to apply to fuzzy policy without requiring any insights that are not obvious from reading this document or from the prior art cited here.

The notation used to denote policy thus far does not admit real-time learning. Reinforcement learning allows a policy to depend upon (i.e., be conditioned on) previous events experienced by the agent. Therefore, we have a dynamic stochastic policy $\pi^c_t$ that for state $s \in S$ chooses action a with probability $$P[a_t = a | s_t = s] = \pi^{c,k}_t(s,a,a^{t,k}, s^{t,k}),$$

where now policy execution over state space (the current action ranking) is function of the k previous actions and stimuli:

$$\pi^{c,k}_t(\cdot,\cdot,\cdot) = f(a^{t,k}, s^{t,k}),$$

where $a^{t,k}$ and $s^{t,k}$ are the historical sequences of the k previous actions and states respectively, such that $a^{t,k} = a_{t-k}, a_{t-k+1}, \ldots, a_{t-1}$, and $s^{t,k=s}_{t-k}, s_{t-k+1}, \ldots, s_{t-1}$. For simplicity in what follows we'll let k=t (indefinite memory), and denote $a^t = a^{t,t}$, $s^t = s^{t,t}$, $\pi^{c,t}_t = \pi^{c,t}_t$, and refer to $\pi^c_t$ instead of $\pi^{c,t}_t$. Where confusion will not arise we may abuse notation slightly and use $\pi^c_t(s, a)$ rather than $\pi^c_{tt}(s, a, a^t, s^t)$, so long as it is clear that the computation of $\pi^c_t$ depends upon previous states and actions, whereas it does not for $\pi$ and $\pi_t$. Reinforcement learning and supervised learning theories each provide several mechanisms entirely suitable for computing f (and thereby, $\pi^c_t$). For a survey of these mechanisms see [Sutton and Barto, 1998] and [Kaelbling, Littman, and Moore, 1996].

Different ways of encoding policy are useful for different purposes. A static policy is useful for encoding simple rules (say, describing expert intuition). A dynamic policy acquired in real-time via statistical learning is good for tracking user behavior via passive observation. In theory, we can easily combine these into a single policy. But in practice, there are good reasons to keep each type of policy separate. One reason is computational efficiency. Simple rules can be efficiently coded as a look-up table. On the other hand, a functional form that is efficient for a simple policy $\pi_t$ (say, requiring only a small table of rules) will in general be inefficient for a complex policy $\pi^c_t$ (for which a compact map will be necessary in general to reduce space requirements). Another reason is modularity. Functional cohesiveness applied to policy improves ease of maintenance.

Conditioned policy obtained by reinforcement learning can be improved further. E.g., it does not yet permit the explicit modeling of particular types of conditioned response that localize certain types of conditioning to particular regions of stimulus space. Both of these issues benefit from a straightforward extension known as a gated policy, as shown in FIG 1D. For a survey of such methods see [Kaelbling, Littman, and Moore, 1996]. A gating function decides which policy should be switched through and actually executed based on the stimulus state.

The "gated behaviors" approach includes a wide variety of methods, from single-level masterslave, to hierarchical-level "feudal Q-learning" [Dayan and Hinton, 1993]. In Maes and Brooks [1990] the policies were fixed and the gating function was learned from reinforcement. [Mahadevan and Connell 1991] fixed the gating function and trained the policies by reinforcement. [Lin 1993], [Dorigo and Colombetti 1994], and [Dorigo 1995] trained the policies first and then trained the gating function. Dietterich and Flann explored hierarchical learning of policy [Dietterich 1997], [Dietterich and Flann 1997]. Whereas these prior art references concentrate on learning the modular sub-policy information, this invention provides a means for combining it in a better way, while still allowing still these methods for learning the sub-policy information to be applicable.

Now we formalize the gated policy approach. This will be useful for clearly defining the novel features of this invention when we formalize its essential features in the specification of the main embodiment below. Let $\pi^c_t$ be a gated policy over a single level of v sub-policies ($\pi^{c,1}_t, \pi^{c,2}_t, \ldots, \pi c, M_t$), with gating function $g : S \to \{1, 2, \ldots, v\}$, which chooses the policy appropriate for the given stimulus state. As with the policies previously defined above, this policy sets the probabilities associated with action tendencies:

$$P[a_t = a | s_t = s] = \pi^c_t(s, a), s \in S, a \in A.$$

If $\pi^c_t$ is to be obtained by a gated selection from a (nonhierarchical) set of sub-policies, then $$\pi^c_t(s, a) = \Sigma_{1 \geq i \geq v} [\pi^{c,i}_t(s, a) I_i(g(s))],$$

where for any integer a, $I_i(a)$ is an indicator function that is equal to 1 when a=i, and 0 otherwise. Note that although this equation involves a summation, it is essentially describes a "switch" that enables one and only one sub-policy. The indicator function $I_i(g(s))$ serves as the "switch." The corresponding action selection drawn accordingly, e.g., (say) by random draw from the actions database according to the policy action probability specified by the selected sub-policy. This invention improves upon the gated approach by replacing the indicator function $I_i(g(s))$ with a weighting function.

To summarize, gated policy methods exemplify the prior art that is improved upon by this invention. Closely related methods are also referred to using terms such as "hierarchical learning," "layered control," and "modular policies." Gated policy methods can compartmentalize learning and response based upon the input state, and can also allow learning to occur at different levels of analysis. In principle, this could be achieved equally well by a monolithic (i.e., non-modular) system, albeit at possibly much more computation required in practical application. I.e., this type of modular policy reduces to a single policy, albeit one obtained by piecemeal composition of sub-policies over state space. Said again in different terms, the sub-policies do not overlap in input space. This constraint is enforced upon all gated policy methods, either explicitly (in that policies respond to mutually distinct portions of the input space) or implicitly (because of the effects of the gating mechanism policies effectively respond to mutually distinct portions of the input space).

D. Drawbacks of Prior Art

The gated policy approach possesses inherent constraints that limit its use. The gated policy approach does not allow multiple overlapping policies to be combined in order to act upon the stimulus in concert. The gated policy approach instead selects a single sub-policy by a crisp selection. There exist practical applications for which overlapping sub-policies are very useful. Another drawback of the gated policy approach is that it can only select from among available policies, it cannot combine them to obtain a compositional policy that is better suited than any of the available policies are individually.

This invention allows multiple overlapping policies to be combined, and this is the central innovation of this patent. Rather than use a crisp selection, this invention employs a "soft" mixture of policies.

Another drawback of the prior art is that the gating mechanism cannot smoothly transition from one policy to another. The switching mechanism is crisp. If the mechanism switches from one policy to another that is markedly different, the resulting change in the behavior will in general be markedly different as well. There are many applications where it is highly desirable to switch from one control regime to another in a smooth fashion.

This invention allows a controller to effect a smooth transition from one policy to another over time.

E. Example Application Illustrating Drawbacks of Prior Art

Here is a description of a practical application intended to highlight specific drawbacks of the prior art.

An electronic commerce website currently utilizes several servers. Each server controls how resources are to be presented to the online shopper. Resources can include product descriptions, suggested product recommendations, or product pricing information. Each server wields a policy that dictates the probability of presentation over the same set of resources. An executive procedure uses this policy to guide how these resources are displayed. But each server uses a somewhat different type of information to formulate its policy. Several such servers are required because each one is especially well-suited for handling particular types of information. One server observes on-site behavior (e.g., pages viewed, browsing behavior). Another server is aware of the user's past purchase transaction history. Another server is able to make recommendations based upon an explicit user profile. Each server is a back-end process controller capable of controlling various front-end processes, such as displaying ads, selecting the presentation of content, or making product recommendations. Conceptually, there is really just a single source of information: i.e., the shopper's behavior. In the space defined by shopper behavior, the input space of these servers "overlap." But because different data structures are used to record shopper behavior, each server seems to operate on a different type of information. Therefore, at the most important level—that being to server the shopper— these servers are wielding overlapping policies. (This example is kept simple for clarity. However, it can be modified slightly to illustrate the practical reality that such servers will often overlap much more explicitly. For example, a shopper answering a questionnaire can result in new information being shunted to both "on-site browsing behavior" as well as "user questionnaire" data structures.)

To reiterate, this example has three servers, each one responding to a different type of information source:

1. on-site browsing behavior
2. explicit user profile or questionnaire
3. past purchase history In this example, all three servers are necessary because no single server can do the entire job effectively. How can the operation of these servers be seamlessly integrated in order to leverage the best attributes of each one?

Suppose only one type of information is available for the visitor (say, there is on-site behavior, but neither explicit user profile nor past purchase history). In this case it is easy to solve the problem at hand: simply select the server that responds to on-site behavior. However, if two types of information are available (say, on-site behavior, and explicit user profile) then the situation is made more complex. Given the prior art the options become:

1. select one server or the other
2. obtain a new server that can utilize both sources of information An additional option would be desirable. If the webmaster could combine the two existing servers together to utilize them in concert than the task would be handled more effectively. Conceptually this reduces to combining two (possibly overlapping) process control mechanisms.

One benefit of a seamless combination of the two existing servers would be to smoothly transition from one server to another. A first-time shopper will quickly generate on-site browsing behavior but won't have past purchase history and may not wish to fill out an explicit user profile. This makes the first server appropriate, and the other two servers completely useless. However, once the shopper generates some purchases, the third server becomes useful. But rather than simply switching over to the third server in a radical fashion as soon as past purchase history becomes available, this invention provides a means to migrate smoothly from one server to the other. The gated policy mechanism is incapable of performing this smooth transition.

Furthermore, a policy obtained by combining the three servers can make best use of each server, using them in concert rather than relying on only one or the other. In some cases, the "on-site browsing behavior" server will provide the best information. In others, the "explicit user profile" will be most effective. But in yet others, no one server will be most effective; rather, a combination of their policies will yield a recommendation that is better than either one individually. While the gated policy mechanism is highly capable of making best use of its individual sub-policies, it is incapable of mixing multiple policies together.

3. OBJECTS AND ADVANTAGES

A. Brief Overview of Novel Features of the Invention

This invention allows process controllers to utilize overlapping policies. See FIG. 2 for a conceptual overview of the general mechanism. Overlapping policies occur when multiple policies can respond effectively to the same stimulus while mapping to the same or different policy space, or map to the same policy space while responding to stimuli that are different but which occur simultaneously, such as controllers that react to different sources of information.

There is good reason for using overlapping policies. It allows a process controller to wield multiple utilities. Different utilities can be used under different circumstances, and the process controller can then wield a "mixture" of utilities. Intuitively, the process controller is able to smoothly apply a multitude of motivational tendencies upon action selection. An immediate consequence is that the process controller can combine controllers that operate on different sources of information. As pointed out by [Sutton 1992] and [Brafman, Tennenholtz, 1996], rational agents are either (a) maximizers of expected utility or (b) reinforcement learners. Process server tasks (e.g., website personalization) naturally admit multiple "utilities" (respectively, "types of preferences"). These utilities correspond to the having multiple objective criteria to be optimized by the controller (respectively, multiple mental states of the user—e.g., attitude, mood, objective, task—or multiple resources being quantified by the server —e.g., dollars spent, units of product sold, number of page views browsed). Or they can (say) correspond to different ways of measuring a single criterion (e.g., "user preference" can be measured in multiple ways, e.g., by first-person subjective opinion via questionnaire, passive observation of actual tendencies, or by comparison to other similar people via collaborative filtering).

The canonical gated policy approach defined above is lacking in several ways:

(1) It has no explicit representation of multiple sources of overlapping policy information.

(2) It has no capacity for smoothly integrating multiple policies.

(3) It has no means for smoothly shifting control from one policy to another.

These limitations are resolved by this invention.

This extension extends modular stochastic control to allow simultaneous application of more than one policy to any particular stimulus (i.e., "overlapping policies"). This exact framework is novel, however, it is similar in spirit and analogous in approach to the Mixtures of Controllers approach [Cacciatore and Nowlan 1994], which is an extension of the well-known Mixture of Experts approach [Nowlan 1990], [Jacobs et al 1991]. One embodiment of the mixture mechanism is a recurrent mechanism analogous to the mixture mechanism used in the mixture of controllers method, but with additional features that allow it to apply to a mixture of policies. These features handle additional complexities that arise when combining policy information that are not an issue when combining either (a) single control signals or (b) single recommendations.

The Mixture of Controllers approach combines the control signals produced by multiple controllers that regulate the same control element. Each sub-controller submits a single control signal to the mixture mechanism, which combines these into a single control signal that is passed on to the controlled element. In that approach the combination is done on each individual control signal (which in the terminology adopted here, corresponds to the control of an individual action), whereas this invention combines entire policies before the control signal (or alternatively, recommendation) is generated.

Recall that a policy corresponds to an entire set of actions. A mixture of policies is more useful for certain practical applications because it is directly applicable for stochastic selection from a database of discrete actions instead of regulating a continuous control signal. For example, this invention is more directly applicable to website personalization tasks than is the Mixture of Controllers approach. Also, this invention separates "policy" from its "execution," whereas the Mixture of Controllers approach does not.

From computer science in general and operating systems in particular it is well understood that this basic encapsulation principle has many advantages, analogous to the way U.S. government separates the formulation of policy from its execution by separating the legislative branch from the executive branch. In addition, this invention provides an additional mechanism for encapsulating "conflict detection," analogous to the judicial branch of the U.S. government. This conflict detection mechanism preemptively detects when a policy will generate conflicts during execution, and also resolves those conflicts.

The Mixture of Experts approach is a prior art that effectively combines multiple policies; however, the Mixture of Experts approach operates in "recommendation space." This broad class of methods includes (a) voting mechanisms, and (b) weighted averaging mechanisms, where several "experts" make a recommendation, and the several recommendations are consolidated (by voting or by weighted average, respectively). This invention differs in that the consolidation of expert "opinions" occurs in policy space rather than in the recommendation space.

The ability to manipulate and combine fuzzy policies has additional advantages in that it allows multiple value functions to be manipulated and combined. Technology for converting a single value function into a policy is standard fare in prior art cited here. However, prior art does not address the combination of multiple value functions (see FIG 1G) or the simultaneous collapse of multiple value functions into a single stochastic policy (see FIG. 1I), or the convergence of multiple stochastic policies in order to obtain a new value function (see FIG 1H).

The mixing function also has a temporal component for regulating the speed of transition of policy over time. See FIG 1J.

Although we describe the main embodiment of this invention with respect to computer-based server applications involving multiple process servers wielding discrete policies another embodiment of the invention applies to combining multiple continuous policies such as those found in some electronic controllers.

B. Practical Advantages of the Invention

Here we highlight the practical benefits of the novel features. Although the illustrative examples described here focus on computer-based database server applications, this method has applicability in process control in general including electronic process controllers.

Combining Policies in "Policy Space"

Combining multiple policies in "policy space" rather than in "recommendation space" delivers additional flexibility over the prior art mentioned above. For example, when mixing a probabilistic policy with a deterministic policy (having all probability concentrated on a single action), the mixture mechanism can let the deterministic policy always dominate the probabilistic policy (see FIG 1E). In some applications this is the preferred result. This reduces to a crisp selection of the deterministic policy and can be performed adequately by the prior art cited here. The Mixture of Policies approach allows this effect, but it also allows the alternative option of letting the probabilistic policy "soften" the deterministic policy (see FIG. 1F). There are applications for which this is the preferred result. The prior art cited here does not allow this result.

Easier to incorporate Conflict Detectors

Combining multiple policies also allows an additional level of separation of policy and execution that is extremely advantageous when combining multiple process servers. FIG. 1G illustrates the combination of two fuzzy policies. Note that as defined here a fuzzy policy can "recommend" more than one action be triggered simultaneously. An agent that formulates a stochastic policy assumes that the executive will select only a single action. Therefore, conflicting actions can be recommended because the conflict is resolved by selecting only a single action. On the other hand, an agent that recommends a fuzzy policy (as defined here) expects more than one action to be selected (in general). Therefore, any mixture of multiple fuzzy policies must perform an additional check to ensure that no conflicts will arise when triggering multiple actions. This functionality is the responsibility of the mixture mechanism referred to here as the Mixing Function.

The result is a separation of "conflict detection and resolution" from policy formulation and policy execution. This adds another useful level of modularity to policy-based control.

Combining Policies in Value-Function Space

A website content server may call upon multiple sub-servers that each recommend content for display. One way to combine these recommendations is to simply combine the policy information provided by each sub-server using the technique described above, which combines multiple policies in policy space. However policy space is not always be the best space in which to combine policies. For instance consider a website that is a portal which "aggregates" content from many other sources. Those sources can be comprised of search engines, or of content servers located at other websites. A "children-friendly" version of the same content is desired that imposes a zero value upon pornographic content. In this case it is required that the probability of displaying pornographic content is not just negligible—it must be exactly zero. Revaluing all pornographic content to zero value can perform this function. Although prior art such as simple filtering mechanisms can perform this same function, this invention allows filtering mechanisms to be seamlessly incorporated with other process controllers, to be extended to allow "softer" forms of filtering, and to be switched on or off at will. Therefore, while the main practical advantage of this invention is its ability to combine policy-based servers in policy space, there are practical applications in which the combination is best performed in value function space; one embodiment of this invention performs the latter task.

Therefore, because fuzzy policy can be used to represent value functions, the ability to manipulate and combine fuzzy policies has practical advantages for manipulating value functions.

It allows multiple value functions to be combined and then handed off to an action selection mechanism (such as a process server) that requires its recommendations be provided as a single value-function (see FIG. 1G)

It allows multiple value functions to be manipulated and combined in order to synthesize a single coherent policy that satisfies these multiple value-functions simultaneously to some degree (see FIG. 1I).

It allows multiple stochastic policies to be mapped back into value function space (see FIG. 1H) where they can be recombined more easily, more intuitively, or with better quality control (e.g., more safely with respect to ensuring that undesirable content will not be displayed).

Technology for converting a single value function into a policy is standard fare in prior art cited here. However, prior art does not address the combination of multiple value functions (see FIG 1G) or the simultaneous collapse of multiple value functions into a single stochastic policy (see FIG. 1I), or the convergence of multiple stochastic policies in order to obtain a new value function (see FIG. 1H).

Smooth Transition of Policy Over Time

The policy mixture mechanism has a temporal component for enforcing smooth transition of policies over time. A website server controlling a graphical interface needs to enforce continuity in order to avoid confusing the user. Discontinuity is a definite disadvantage of the prior art for combining multiple process servers. This invention provides the means to ensure that transition from one policy to another is performed seamlessly and smoothly at a rate that can be precisely controlled. FIG. 1J provides a simple example illustrating the essential elements of this transition over time. Although the sub-policies which input to the system remain unchanged over time, the mixing function adjusts the relative contribution of each policy to achieve a smooth transition from one policy to the other. Of course, this illustration is a rudimentary depiction; the time units, time scale, and number and nature of policies encountered in practical application would differ greatly in general.

Additional Objects and Advantages

Still further objects and advantages will become apparent from a consideration of the ensuing description and accompanying drawings.

4. SUMMARY OF THE INVENTION

The invention provides a method and apparatus for combining a plurality of overlapping policy-based process controllers via a mixture of policies mechanism. The invention is also useful for smoothly transitioning control from one controller to another. The invention is also useful for separating conflict detection and resolution from policy formulation and execution.

Many signal-processing applications used to control or regulate other systems can be treated as "policy-based controllers." In particular, the invention is applicable to policy-based process servers as well as electronic controllers. A "policy-based" controller admits a conceptual decomposition into "policy" and "executive." The policy formulated by a policy-based controller is provided to an executive mechanism that then uses that policy to guide how it executes actions, such as regulating control signals, triggering procedures, or regulating ongoing processes or procedures. The concept of "policy" is quite useful because the task of regulating a policy-based controller reduces to the task of regulating the associated policy and the associated action selection executive.

A "policy" can be used to exert probabilistic control but can also be used for deterministic control. It can also be used for parallel control of multiple control signals, or for triggering multiple processes in parallel. Because "policy-based controllers" can be effectively reduced to their associated policy information, this implies that by combining their respective policies one can combine the controllers.

Separating policy from execution facilitates the design and development of flexible controllers. Decomposing a complex policy into sub-policies facilitates the design and development of flexible policies. However, the prior art are limited in their methods for handling sub-policy information. The present invention combines the several policy-based "sub-servers" by combining the "sub-policies" associated with each sub-server into a single policy. The system combines multiple policy-based sub-servers by combining the associated distributional information according to a measure of relative contribution. The system allows (but does not require) temporal smoothing of the policy mixture mechanism. The system provides for detection and resolution of conflicts that will arise as a result of combining otherwise incompatible sub-policies. The preferred embodiment combines the sub-servers by combining the respective sub-policies, but another embodiment combines the sub-servers by combining the respective value functions associated with each sub-server.

A useful characteristic of policy-based controllers is the separation of policy formulation from policy execution. This invention allows another level of modularity by encapsulating the procedures required for detecting and resolving conflicts that arise as a result of combining otherwise incompatible sub-policies.

The invention is suitable for integrating multiple process servers on websites. Examples of website servers include content servers, ad servers, and recommendation engines. Examples of applications for such website servers include but are not limited to personalization systems, content servers for displaying targeted content, electronic commerce product recommendation systems, and ad servers for displaying targeted advertisements. Method and apparatus is also suitable for regulating reactive behaviors in social agents and virtual personality simulations, such as facial expressions, as well as displays of reactive affect in general, such as hand gestures and other nonverbal body language.

In another embodiment, the invention may be implemented to provide a method for combining multiple electronic controllers. Robotic toys and toy dolls exemplify the type of hardware platform that can benefit from the combination of multiple simple controllers, rather than the alternative of creating a more complex monolithic controller. The invention can be used to obtain complex controllers by combining multiple simpler controllers. Another embodiment of the invention can also be used to simplify the design and implementation of monolithic controllers by applying the engineering design discipline strategies of modularization and encapsulation. This allows the designer to more easily scale up to greater complexities. This invention provides methods for doing so which are more flexible than prior art.

Other applications are apparent to anyone familiar with the technology and with the benefit of this specification.

5. DESCRIPTION OF DRAWINGS

FIGS. 1A through 1J are relevant to the background of this invention. These drawings illustrate terminology, introduce important concepts, describe prior art, or explain the limitations of prior art. FIGS. 2 through 14 describe this invention.

PRIOR ART

FIG. 1A illustrates a simple stochastic policy. Depicted is a stochastic policy with 5 actions. The action selection probabilities sum to 1.0. Although for simplicity we refer to "actions" the policy can control procedures by letting an action trigger a procedure.

FIG. 1B illustrates the special case of stochastic policy given by a deterministic policy. Depicted is a deterministic policy with 5 actions. The action selection probabilities still sum to 1.0, but 100% of the action selection probability is amassed upon a single action.

FIG. 1C illustrates a simple fuzzy policy. Depicted is a fuzzy policy with 5 actions. Instead of "action selection probability" the policy defines "degree of membership," which is a distribution that need not be probabilistic. Therefore, the summation of degree of membership can exceed 1.0.

FIG. 1D illustrates the prior art for selecting from among a plurality of policies using a gating approach. It also shows how the resulting policy is then passed along to the action selection executive. This depicts the essential operation of prior art that utilizes a gated set of policies, the current state of the art in reinforcement learning of stochastic control policy. A straightforward extension of this is obtained by applying the gating mechanism recursively to each policy to obtain a hierarchical system with multiple levels of abstraction.

FIG. 1E illustrates the process of letting a "crisp" deterministic policy "dominate" a stochastic policy, a process that can be achieved by prior art as well as by this invention. For some applications if one policy's recommendation puts all its weight upon a single action then that action will be preferable. This process can be achieved by prior art as well as by this invention.

FIG. 1F illustrates the process of using a stochastic policy to "soften" the crisp recommendation given by a deterministic policy. This process is easily achieved by this invention but using prior art this is at best, more difficult to implement, and at worst, not at all possible. In this illustrative example, the output policy is a simple average of the two input policies.

FIG. 1G illustrates the concept of combining a plurality of fuzzy policies using a simple combination of two fuzzy policies. In this illustrative example, the output policy is a simple average of the two input policies.

FIG. 1H illustrates the concept of combining a plurality of stochastic policies to obtain a fuzzy policy using a simple combination of two stochastic policies. In this illustrative example, the output policy is obtained in two steps: (a) Apply a winner-take-all selection mechanism to each stochastic policy, resulting in Actions 1 and 4 being selected. (b) Add Actions 1 and 4 to the output fuzzy policy using their weighting under the individual stochastic policies to specify their weight in the fuzzy policy. (The Mixing Function possesses additional functionality required to resolve conflicts that is not illustrated by this example.)

FIG. 1I illustrates the concept of combining a plurality of fuzzy policies to obtain a stochastic policy using a simple combination of two fuzzy policies. In this illustrative example, the output policy is a simple average of the two input policies normalized to convert the distribution into a probability distribution.

FIG. 1J illustrates the concept of a mixture of policies evolving over time using a simple combination of two stochastic policies that evolves over 3 time steps. Demonstrating the temporal aspect of the mixing function. At t=−2, the mixing function gives more weight to Policy B. At t=−1, the mixing function has evolved, now giving equal weight to each policy even though Policy A and Policy B remain unchanged; the output policy is a simple average. At t=0, the mixing function gives more weight to Policy A. This mechanism allows control to be switched smoothly from one regime to another over time. Although this example illustrates the concept of smooth temporal regime switching using two fuzzy policies, the same basic concept applies to mixtures of other types of policy.

DRAWINGS DESCRIBING THIS INVENTION

FIG. 2 is a conceptual overview of the invention and how it integrates with an action selection executive to achieve the desired result of serving as a controller or process server. Illustration depicts a mixture of policies. This extends the gated policy approach by modifying the gating mechanism in two essential ways: 1. Crisp selection is replaced by a mixing function. 2. The mixing function has state (i.e., is persistent), resulting in a functional dependence of the mixing function upon its state over a previous time range. Compare and contrast this figure with FIG. 1D.

FIG. 3 shows the major components of the invention. The mixing function takes N policies and generates as output a policy that depends upon the N input policies and previous state of the mixing function. The "mixing function" is referred to as a function because at any particular moment in time it performs a functional mapping into policy space. However, the mixing mechanism computed by the mixing function need not be a static function or purely reactive control mechanism—it may invoke procedural code or physical processes.

FIG. 6 shows one embodiment of how to construct the Policy Database shown in FIG. 5 in terms of tables and their associated schemas.

FIG. 15: a perspective view of an exemplary signal-bearing medium in accordance with one embodiment of the invention.

6. DETAILED DESCRIPTION OF THE PREFERRED EMBODIMENTS

This section provides a detailed static description of the preferred embodiments. To better understand the components and methods of the invention a general statement of the relationships, nomenclature, and environment used to implement the embodiments of the invention follows in sections A through C. Thereafter, the apparatuses, methods, and signal bearing mediums of the present invention are described.

A. Introduction

Figure 2:
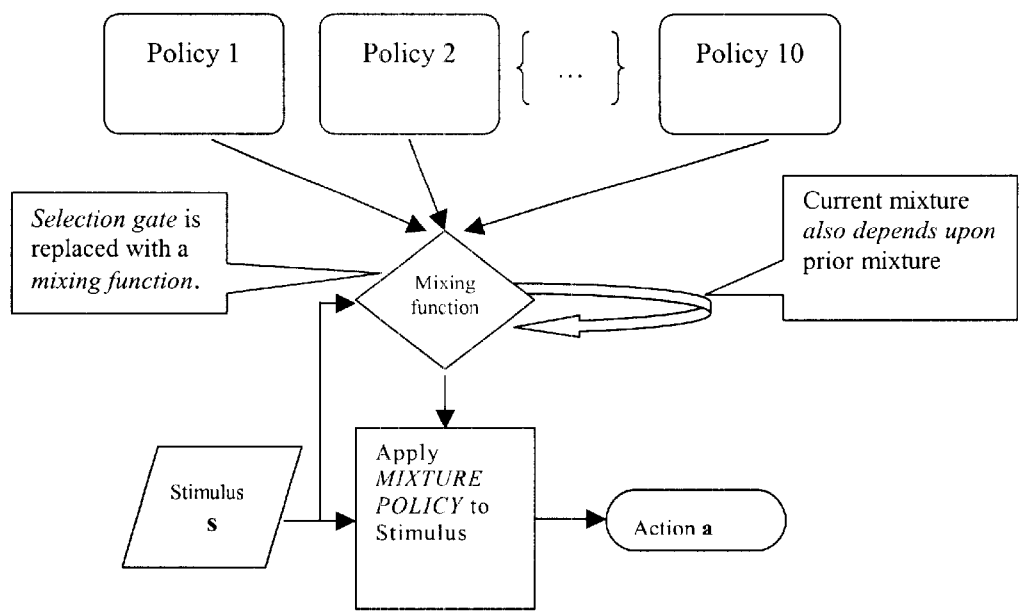

See FIG. 2 for a conceptual overview of the invention. See the section above titled Formal Definition of Prior Art for definition of basic terms such as "policy" and "stimulus."

B. Formal Definition of the Mixture of Policies Framework

Let S represent the space of all possible stimuli, modeled as a subset of a real-valued Euclidean space. The "mixed" policy $\pi^m_t$ is composed of v sub-policies ($\pi^{m,1}_t, \pi^{m,2}_t, \ldots, \pi^{m,v}_t$), along with the "mixing function"

$$g^m : S \times E \rightarrow E,$$

where space E is the set of permissible mixture distributions over policy space:

$$E \subset [0,1]^v.$$

We define E as a hypercube without loss of generality—one could certainly use an arbitrary subset of v-dimensional Euclidean space but this extension is trivial because it provides no apparent advantage in and of itself and unnecessarily complicates the operation of the mixing function. The stimulus space employed here include external stimuli as well as internally7 stored representations of previous stimuli or internally generated state information. Mixture distributions are not restricted to probability distributions, although that is certainly allowed. The mixing function $g^m$ is similar to the gating function g defined previously, but rather than choose a single policy appropriate for the given stimulus state, the "soft" gating function given by $g^m$ can apply a mixture of policies. Furthermore, whereas g is stateless, $g^m$ is indexed by the mixture state space E. We define the "mixture state" as a point in E, but we expect that a "mixture state" per se would be modeled by correspondence to regions within E.

Mixed policy is defined to be adaptable, but for simplicity, during execution of the policy $\pi^m_t$ upon a given a∈A (action space), s∈S (stimulus space), we may refer to $\pi^m_t(s,a)$ rather than the more strictly appropriate πhu $m_t(s,a,a^t,s^t)$. For ease of description it suffices to let $\pi^m_t$ be a linear weighted sum of the v sub-policies, so that for a∈A, $s_t \in S$, $$\pi^m_t(s^t,a) = \Sigma_{1 \leq i \leq v} [\pi^{m,i}_t(s^t,a) g^m_i(s^t, g_{t-1})],$$

where $g_{t-i} = g^m(s_{t-1}, g_{t-i-1})$, integer i<t, $g=(g_0,g_1,\ldots,g_v)$, g∈E, and $\pi^{m,i}_t$ is the policy function for the $i^{th}$ sub-policy. The mixing function $g^m$ associates a scalar value with each sub-policy that defines its participation. Hierarchical mixtures of policies are available in other embodiments of the invention. Recursive application of the mixtures of policies mechanism is available in other embodiments of the invention.

A hierarchical mixture of policies is readily obtained by recursive application of the main concept, i.e., by decomposing sub-policies into mixtures of "sub-sub-policies."

FIG. 2 depicts a conceptual description of the mixture of policies method and its relation to the action selection mechanism.

Having provided an easily understood embodiment, we now provide the preferred embodiment of the general mixture mechanism:

(a.) Specify the v sub-policies at time t: $\{\pi^{m,i}_t\}$, i=1, 2, ..., v, where $\pi^{m,i}_t$ is the policy function for the $i^{th}$ sub-policy at time t.

(b.) Specify the #A actions a∈A, and the stimulus $s_t \in S$.

(c.) Specify the set of permissible mixture distributions over v-dimensional policy space: $E \subset [0,1]^v$.

(d.) Specify the "recursive mixing function" $g^m$: S×E→E, such that for stimulus $s_t \in S$, and mixing value h∈E, $g^m_t(s_t, h) \in E$.

(e.) Specify the value of the mixing function at the previous time step t−1 represented by the recursive function $h_t = g^m(s_{t-1}, h_{t-1})$, such that the recursion is finite such that $h_0$ is defined to take a value in E.

(f.) Specify the decomposition of the mixing function value g∈E into its v components $g=(g_0, g_1, \ldots, g_v)$, such that given stimulus $s_t \in S$ at time t, said decomposition is given by $$g^m(s_t, h_t) = (g^m_1(s_t, h_t), g^m_2(s_t, h_t), \ldots, g^m_v(s_t, h_t)),$$

(g.) Compute the functional composition f of the v sub-policies $\{\pi^{m,i}_t\}$, i=1,2, ..., v, and the v-dimensional mixing function $g^m$, taking its value in E such that given stimulus st, action a, and previous mixing value $h_t$, f computes the policy weighting for action a given the stimulus:

$$\pi^m_t(s_t,a) = f(g^m(s_t, h_t), \{\pi^{m,i}_t(s_t,a)\}_{i=1,2,\ldots,v}).$$

A special case of this uses the non-recursive mixing function $g^m$: S→E, such that for stimulus $s_t \in S$, $g^m(s_t) \in E$, thereby f computes the linear weighted sum of the v sub-policies as weighted by $g^m$:

$$\pi^m t(s_t,a) = \Sigma_{1 \leq i \leq v} [\pi^{m,i}_t(s_t,a) g^m_i(s_t)].$$

C. The Policy Mixture Mechanism

Figure 3:
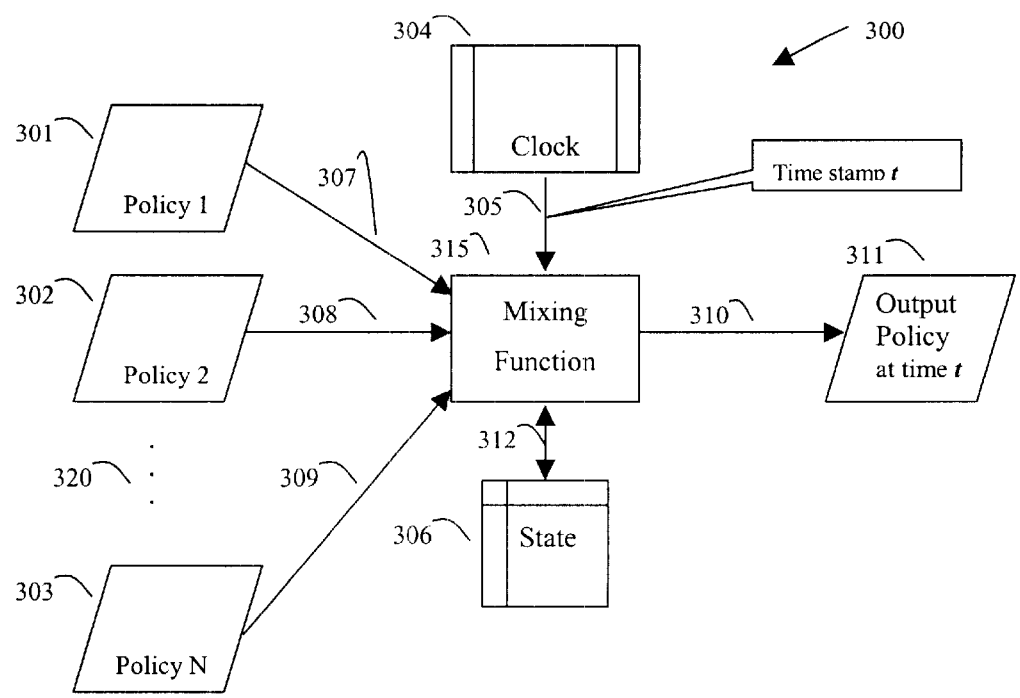

FIG. 3 gives a description of the major sub-components of the policy mixture mechanism, and illustrate how the mixing function module fits into the overall mechanism.

Mixed policy differs from gated policy in that policy is computed by "mixing" sub-policies according to a "mixture mechanism." This "mixture mechanism" furthermore has persistence. Suppose reinforcement learning is disabled at time t. Let $f^g_t$ denote an action selection function that accepts a stimulus $s_t$ and gated policy $\pi^g_t$ and selects an action $a = f^g_t(\pi^g_t(st))$. Let $f^m_t$ denote an action selection function that accepts a policy $\pi^m_t$ generated by this invention and selects an action $a = f^m_t(\pi^m_t(s_t, g^m_t))$. Abusing notation slightly to make the point clearer, let $f^g_t(s_t) = f^g_t(\pi^g_t(s_t))$ and $f^m_t(s_t) = f^m_t(\pi^m_t(s_t, g^m_t))$. Note that for the gated policy approach the resulting policy is static, so that and $s_t = s_{t+i}$, i=1,2, ..., implies $\pi^g_t(s_t) = \pi^g_{t+i}(s_{t+i})$ and therefore $f^g_t(s_t) = f^g_{t+i}(s_{t+i})$, i=1, 2, ... Note that because $g^m$ possesses state, $s_t = s_{t+i}$ does not imply $f^m_t(s_t) = f^m_{t+i}(s_{t+i})$, i=1,2,..., because in general $\pi^m_t(s_t, g^m_t) \neq \pi m^m_{t+i}(s_{t+i}, g^m_{t+i})$.

The mixture state can be regulated to deliver effects not possible under the gated approach. Certain mixture states can thereby be more persistent than others, such that, e.g., a policy can be biased to follow a particular mixture of policies most of the time, except for occasional excursions to other points in mixture state. Transition within mixture state is regulated by a smoothness condition upon $g^m$ that specifies the speed of transition within E dependent upon location within E. One embodiment of this invention is to let $g^m_{t+1}(s,g_t) \in E$, $b \in B$, $s \in S$, $g_t \in E$, such that $(g^m_{t+i}(s,g^m_t)-g_t)<\beta(g_t)$ for some $\beta: E \to \Re$. This mechanism explicitly models the "duration" of a behavioral regime in the preferred embodiment of the invention.

Here is one embodiment of the recursive mixing function $g^m$: $S \times E \to E$. For stimulus $s_t \in S$, and mixing value $r \in E$, $g^m(s_t,r) \in E$, define the non-recursive mixing function g: $S \to E$ such that for stimulus $s_t \in S$, $g(s_t) \in E$. Next, let the value of the mixing function at the previous time step t−1 be represented by the recursive function $h_t = g^m(s_{t-1}, h_{t-1})$, such that the recursion is finite so that $h_0$ is defined to take a value in E. Let the scalar value $x \in [0,1]$ and the scalar value $y=1-x$. Specifying the function $q_t$: $E^1 \to E$ such that $q_t(h_t, h_{t-1}, h_{t-1}, \ldots, h_1) \in E$, define the recursive update function such that given stimulus $s_t \in S$ at time t, $$g^m(s_t, h_t) = x\, g(s_t) + y q_t(h_t, h_{t-1}, h_{t-1}, \ldots, h_1).$$

Another embodiment takes $g^m(s_t, h_t) = x g(s_t) + y\, h_t$.

D. Hardware Components and Interconnections

One embodiment of the invention utilizes a signal processing system 300 for combining the policy information generated by a plurality of controllers, which may be embodied by various modular components and interconnections as described in FIG. 3.

Referring to FIG. 3, a signal processing system 300 is illustrated. In the architecture shown, the apparatus 300 includes N signal processing devices 301, 302, 320, and 303, which function as policy-based controllers. Here N is some finite integer number. The fact that these are "policy-based controllers" implies that by combining their respective policies one can effectively combine the controllers. Each controller provides policy information via interconnections 307, 308, and 309 to the Mixing Function module 315. State information, including external stimulus and internal state memory is provided by module 306. In accordance with a timing module 304 and state 306 the policies associated with the input signal processing devices 301, 302, 320, and 303 are combined and transmitted by interconnection 310 to result in the Output Policy 311. This process occurs repeatedly over time.

1. Digital Database Processing Systems

Figure 4A:
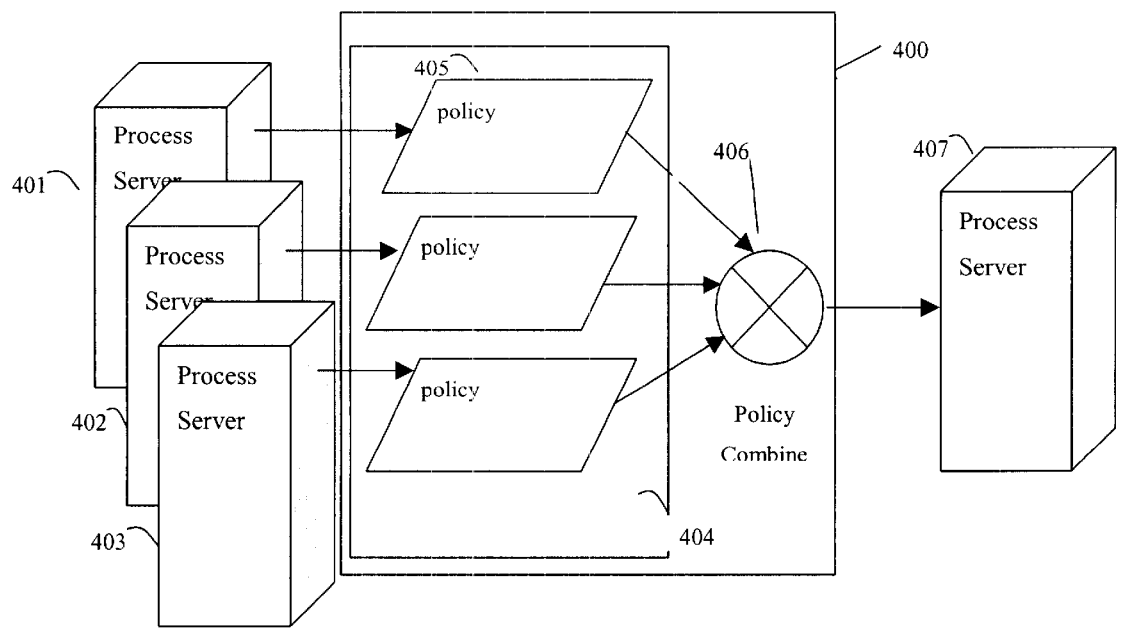
FIG. 4A is a block diagram of the major hardware components and interconnections in accordance with one embodiment of the invention as a process server.

One embodiment of this signal processing system is a digital data processing apparatus 400 for analyzing databases, as illustrated in FIG. 4A. Referring to FIG. 4A, a plurality of server computers 401, 402, and 403 provide policy information that is stored in a policy database 404 contained within server computer 400. For example, a server computer 401 transmits policy information 405 to a server computer 400 by depositing the policy information 405 into a policy database 404.

In one embodiment, the server computers 400–403 may be personal computers manufactured by Gateway Incorporated, and may use an operating system manufactured by Microsoft Corporation. Or, the server computers may be Unix computers running the Linux operating system. Or, the server computers 400–403 may be hosted by a single computer containing a plurality of CPU processors. Or, server computers 401–403 may be independent process servers represented as separate software applications running within a single computer utilizing a single CPU, or utilizing a plurality of CPUs. Server computers 400–403 may incorporate a database system, such as ORACLE, or may access data on files stored on a data storage medium such as disk, CDROM, DVD, or tape.

FIG. 4A shows that, through appropriate methods and procedures 406 the behaviors of server computers 401–403 are combined by server computer 400 and transmitted to server computer 407. Data access programs and procedures 406 access data generated by servers 401–403 via Policy Database 404. Other server computers, process servers, application servers, computer architectures, or database systems than those discussed may be employed. For example, the functions of server computer 407 may be incorporated into server 401, and vice versa. Methods and procedures 406 integral to server computer 400 may be housed separately from other methods and procedures integral to the server computer 400 illustrated in this embodiment. For example, server computers 401–403 may be housed within a single database processing system that includes Policy Database 404, and methods and procedures 406 may be housed within server computer 407.

Other embodiments may employ yet other architectures. For example, the functions of server computer 407 may be incorporated into server 401, and vice versa. Different embodiments of this invention may utilize different numbers of servers. The server computers may have different functions (such as personalization system, content server, or ad server), such that for example, server computer 401 may be an ad server, and server computer 402 may be a content server. They all may have similar functions (e.g., all being ad servers).

2. Electronic Signal Processing Systems

Figure 4B:
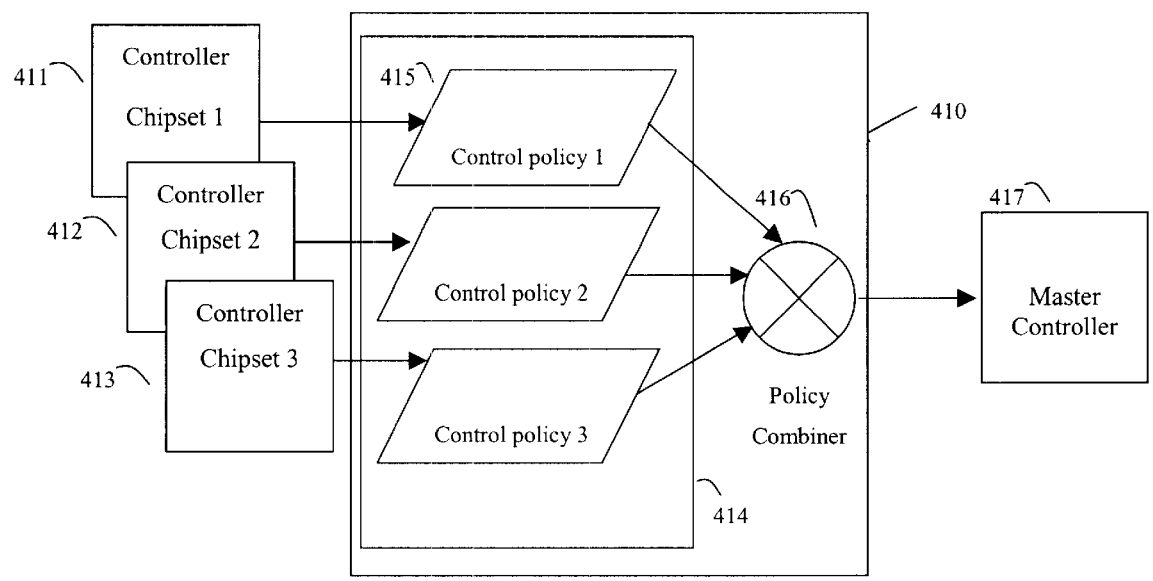
FIG. 4B is a block diagram of the major hardware components and interconnections in accordance with one embodiment of the invention as an electronic controller.

Another embodiment of this signal processing system is an electronic controller 410 illustrated in FIG. 4B. Referring to FIG. 4B, an electronic controller 410 may be analog or digital in operation, and contain a plurality of subcontrollers 411, 412, and 413. Subcntrollers 411, 412, or 413 may each be an entire chipset, or may each be a single CPU, or may all be housed within a single CPU. Sub-controllers 411, 412, and 413 may be general purpose CPUs such as the Pentium III sold by Intel Corporation, or the 68332 microprocessor sold by Motorola. Alternatively, subcontrollers 411, 412, and 413 may be special-purpose chipsets utilized in robotic toys such as those manufactured by IS Robotics Corporation, or in electronic circuitry made available to experimenters and robot enthusiasts by Diversified Enterprises (of Santa Barbara Calif.). Each sub-controller provides Control Policy information deposited within a central repository referred to here as the Controller Policy Interface 414. The Policy Integrator 416 accesses policy information from the Controller Policy Interface 414, combines it and outputs it to a Master Electronic Controller 417. Other architectures may be employed. For example, the functions of Controller Chipset 411 may be combined with the functions of Controller Chipsets 412 and 413. The functions of the Master Electronic Controller 417 and the Electronic Controller 410 may be combined within a single CPU, or within a single chipset. The functions of Electronic Controller 410 and the sub-controllers 411–413 may be combined within a single CPU or within a single chipset. Policy Integrator 416 may be contained in Electronic Controller 407, and Controller Policy Interface 414 may be contained in a single CPU along with 411–413, Different embodiments of this invention may utilize different numbers of sub-controllers.

3. General Signal Processing System

Figure 5:
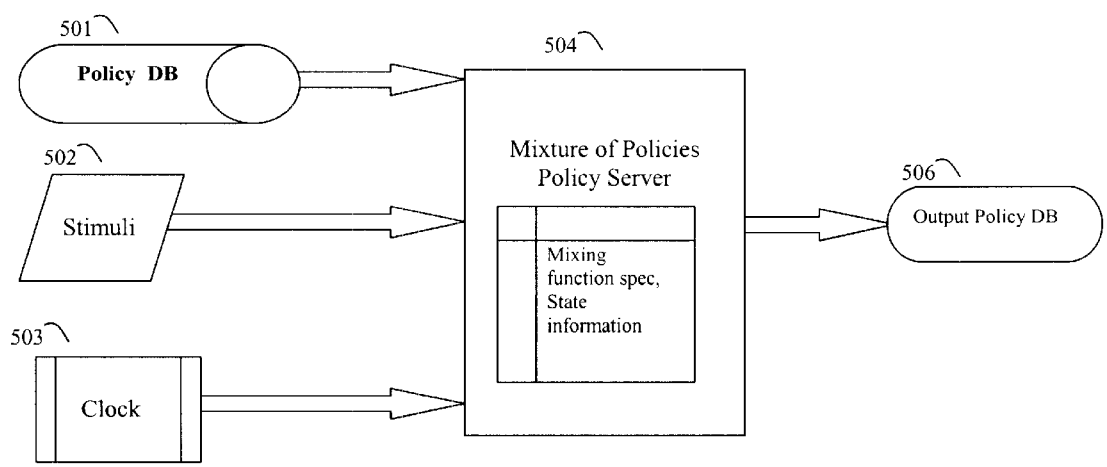
FIG. 5 is a block diagram of the major components of this invention specifically related to the data flow and control flow aspects of the operation of one embodiment of the invention.

The embodiments of FIGS. 4A and 4B can be conceptualized within a common framework as illustrated in FIG. 5.

The Policy Database 404 and Controller Policy Interface 414 correspond to the Policy Database 501. The Policy Integrators 406 and 416 correspond to the Mixture of Policies Server 504. The Mixture of Policies Server 504 outputs its results to the Output Policy repository 506, which is accessed by the server computer 407 or by the Master Electronic Controller 417, respectively, depending upon which of the two embodiments depicted in FIGS. 4A and 4B are employed. Other hybrid architectures are possible by employing a combination of components drawn from the embodiments depicted in FIGS. 4A and 4B.

4. One Embodiment of the Policy Database

If the Policy Database 501 is represented using a database file system, then in this embodiment the component tables that comprise the Policy Database may be constructed as depicted in FIG. 6. Table 601 defines the specification of the policy specification table. Table 602 defines the schema of the policy table. Table 603 defines the schema of the action table. Tables 601, 602, and 603 could be represented by alternative arrangements. They could be stored in flat files, or represented in logic stored within electronic circuitry or in another information storage device.

5. Other Embodiments will be Apparent to Skilled Artisans

Despite the specific foregoing description, ordinarily skilled artisans having the benefit of this disclosure will recognize that the apparatus discussed above may be implemented in a machine of different construction, without departing from the scope of the invention. As a specific example, one of the components 413 may be eliminated. Or, the server computer 403 may be integral to server computer 407, or it may include server computer 401, or may handle the functions of Policy Integrator 406, or include all of server computer 400. Regardless of the configuration of the resulting machine, the signal processing system comprised by the machine contains several distinct control mechanisms that are consolidated into a single control mechanism in a particular manner corresponding to a "mixture of policies." The manner in which this "mixture of policies" mechanism is achieved is described in the next section.

7. OPERATION OF INVENTION

In addition to the various hardware embodiments described above, a different aspect of the invention concerns an operational method for combining a plurality of control policies ("sub-policies") to create an output result that, in a particular sense, comprises a mixture of the sub-policies. By this method it is possible to combine a plurality of electronic controllers, or to combine a plurality of digital computer process servers.

A descriptive overview of a single iteration for a general embodiment of the invention is shown in FIGS. 7–14. A high-level specification of this iterative process is given by FIG. 7. Subsequent FIGS. 8–14 refine or elaborate upon modules depicted in FIG. 7.

For ease of explanation, but without any limitation intended thereby, the examples of FIGS. 7–14 are described in the context of the process server computer system 400 described above and illustrated in FIG. 4A.

A. Embodiments of the General Method

This procedure may be implemented, for example, by operating a server computer 400 shown in FIG. 4A to execute a sequence of machine-readable instructions. These instructions may reside in various types of data storage medium. Data storage medium may comprise of random access memory (RAM) contained within server computer 400. Alternatively, the instructions may be contained in another data storage medium such as a magnetic data storage diskette 1500 as shown in FIG. 15. Whether contained in server computer 400 or elsewhere, the instructions may be instead stored on an alternative data storage medium such as a direct access storage device (hard drive, RAID array, CD-ROM, DVD disk, WORM), solid state electronic memory such as RAM, or sequential access memory such as magnetic tape, paper punch cards, or punch-hole tape.

These instructions may be encoded using various types of programming languages such as C, C++, Fortran, Java, Javascript, BASIC, Pascal, Perl, TCL, or other similar programming or scripting language. These instructions may be in the form of machine-readable instructions such as compiled Java bytecode, or in uncompiled Javascript. In this respect, one aspect of the present invention concerns an article of manufacture, comprising a data storage medium tangibly embodying a program of machine-readable instructions executable by a digital processing system to perform the operational steps to combine a plurality of server processes.

In another embodiment of this operational procedure may be implemented by operating an electronic controller 410 in FIG. 4B to execute machine logic. This machine logic may reside in various types of data storage medium. Data storage medium may comprise of random access memory (RAM, ROM, or EPROM) contained within electronic controller 410 or accessible to electronic controller 410 by a data interconnection. Whether available within electronic controller 410 or via interconnection to external storage medium, the instructions may be contained in other data storage media, such as a magnetic data storage diskette 1500 as shown in FIG. 15, or in a direct access storage device (hard drive, RAID array, CD-ROM, DVD disk, WORM), solid state electronic memory such as RAM, or sequential access memory such as magnetic tape, paper punch cards, or punch-hole tape.

These instructions may be encoded using various types of programming languages such as C, C++, Fortran, Java, Javascript, BASIC, Pascal, Perl, TCL, or other similar programming or scripting language. These instructions may be in the form of machine-readable instructions such as compiled Java bytecode, or in interpreted Javascript. In this respect, one aspect of the present invention concerns an article of manufacture embodying a system of machine-logic executable by a signal processing system to perform the operational steps to combine a plurality of electronic controllers.

B. The General Method

As mentioned above, FIGS. 7–14 show a sequence of method steps illustrating the method aspects of the invention. Readers familiar with the particular methodology associated with stochastic control will readily understand the following detailed descriptions. Readers familiar with the general methodology associated with an information science (e.g, computer science, computer programming, computer architecture, operating systems science, control systems science, electrical engineering, economics, econometrics, mathematical programming, electronic engineering) will readily be able to understand the following detailed descriptions. Readers familiar with the general methodology associated with an engineering discipline related to signal processing systems (e.g, computer science, computer programming, computer architecture, electrical engineering, electronic engineering) will be able to implement the following detailed descriptions in a physical realization such as one of the embodiments described above.

For ease of explanation, but without any limitation intended thereby, the examples of FIGS. 7–14 are described in the context of the process server computer system 400 described above and illustrated in FIG. 4A.

1. Process Specification for main Embodiment

Figure 7:
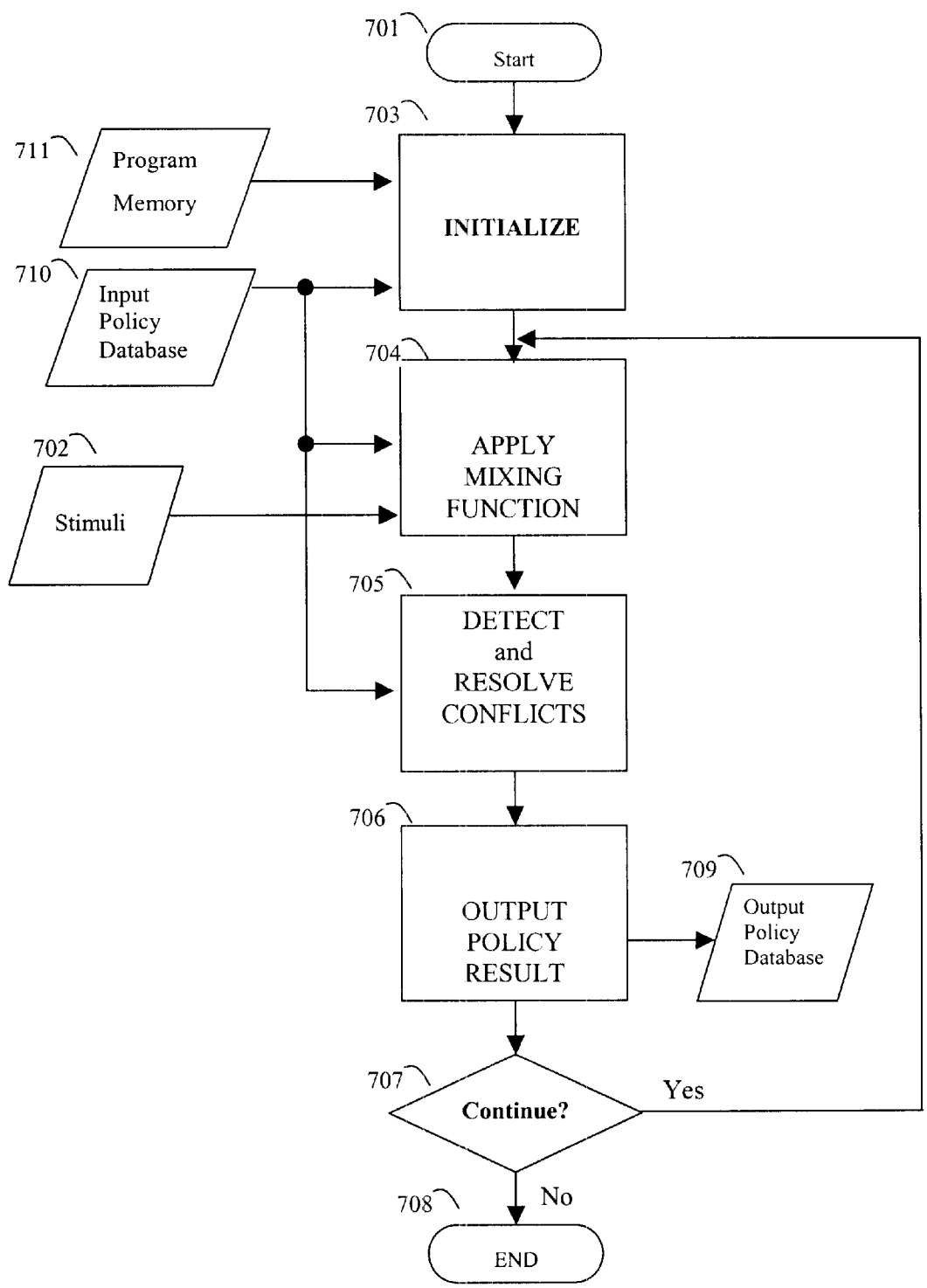
FIG. 7 is a flowchart of an operational sequence to combine a plurality of control policies in accordance with one embodiment of the invention.

Referring to FIG. 7, the general method of the invention begins in step 701. In this example the control flows sequentially through four main modules 703–707. Input from stimulus 702 and Input Policy Database 710 is processed and the result is deposited in Output Policy Database 709.

a) Intialize Module

Figure 8:
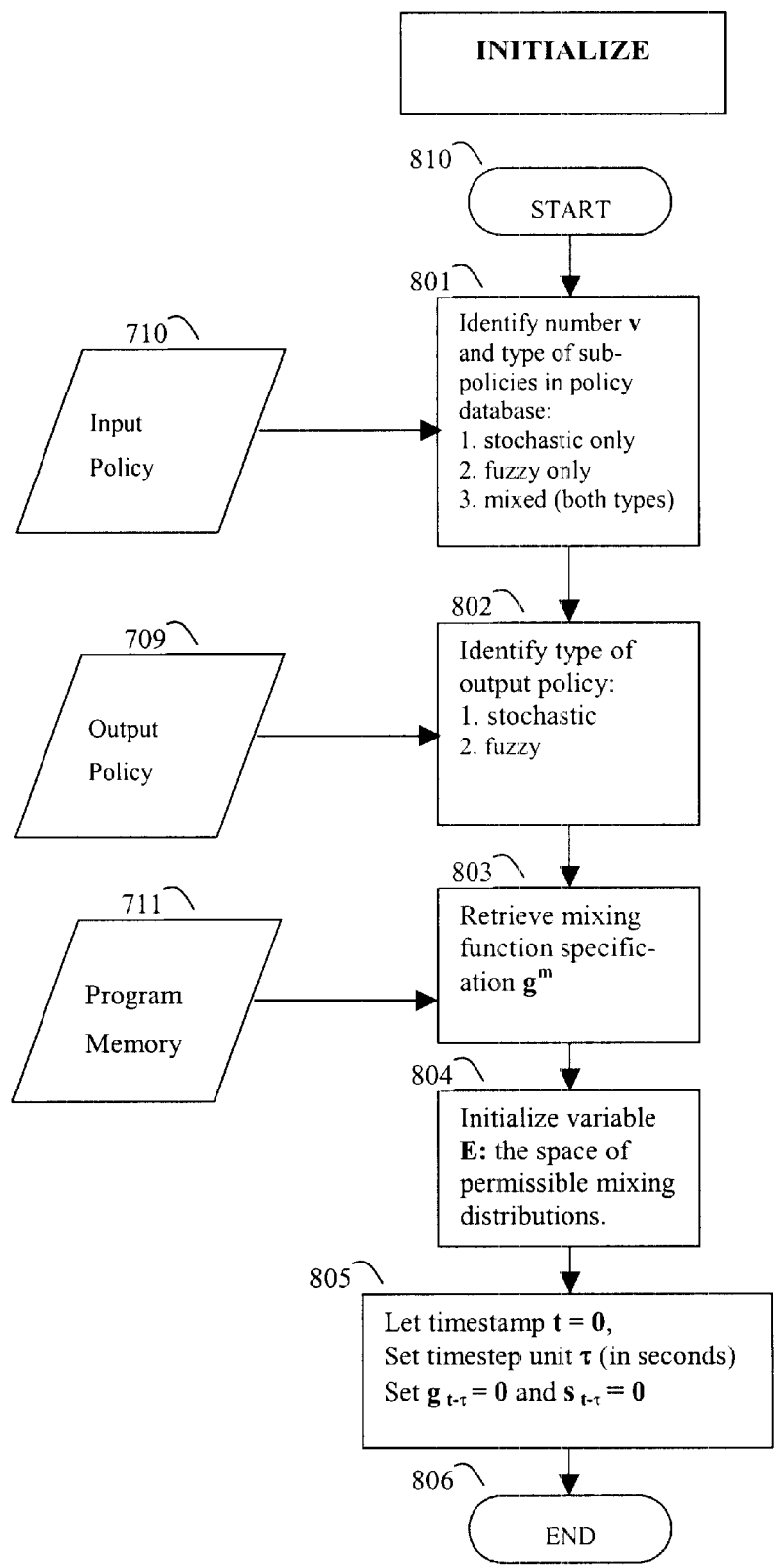
FIG. 8 is a flowchart of an operational sequence to combine a plurality of control policies in accordance with one embodiment of the invention.

Control flow begins in step 701 and proceeds to step 703. Step 703 initializes key parameters. Step 703, "INITIALIZE," is described in further detail in FIG. 8. Referring to FIG. 8, certain parameters are specified within the INITIALIZE module itself, whereas the values of other parameters are determined by querying input processes. Step 801 queries the Input Policy Database 710 to identify the number v of sub-policies represented within Input Policy Database 710. The types of policies contained in Input Policy Database 710 are also identified and a memory variable set to be one of three cases: 1. Input Policy Database contains only stochastic policies. 2. Input Policy Database contains only fuzzy policies. 3. Input Policy Database contains at least one stochastic policy as well as at least 1 fuzzy policy. (A Deterministic Policy is a special case of Stochastic Policy and is treated as a Stochastic Policy.)

Step 802 queries the Output Policy Database 709 to determine the type of Output Policy. A memory variable is set to one of two cases: 1. Stochastic, or 2. Fuzzy, depending upon the type of Output Policy. Step 803 initializes the mixing function specification $g^m$. One embodiment of this invention allows $g^m$ to be retrieved from external memory storage; however, for this example of the general method the mixing function specification is retrieved from internal Program Memory 711 internal to the process server computer 400. Henceforth, we will assume that Program Memory 711 is read-write accessible to all steps in FIGS. 7–14.

b) Specification of the Mixing Function and Mixing Space

The range of valid specifications for mixing function $g^m$ is precisely defined above in the section titled "Formal Definition of the Mixture of Policies Framework." We provide a specific embodiment here. Recall that one embodiment of $\pi^t$ is as a linear weighted sum of the v sub-policies, so that for $a \in A$, $s_t \in S$, $$\pi^m_t(s_t,a) = \Sigma_{1 \leq i \leq v} [\pi^{m,i}_t(s_t,a) g^m_i(s_t, g_{t-1})],$$

where $g_{t-i} = g^m(s_{t-1}, g_{t-i-1})$, integer $i<t$, $g=(g_0,g_1, \ldots, g_v)$, $g \in E$, and $\pi^{m,i}_t$ is the policy function for the $v^{th}$ sub-policy. Let h: S→E. This means that h is a function that takes as one of its input parameters a stimulus $s \in S$ and outputs a v-dimensioned vector $(h_1, h_2, \ldots, h_v)$. Let $h_{t-1}=h(s_{t-1})$, and $h_t=h(s_t)$. Now let $g^m_i(s_t, g_{t-1}) = 0.1\ h_{t-1} + 0.9\ g_{t-1}$. Intuitively, h responds to a stimulus and provides a "target" location in mixing space towards which the mixing function $g^m$ moves. If the stimulus remains unchanged over two successive time steps t and t−1, then $h_{t-1}=h_t$ and the mixing function will steadily move closer to $h_t$. This is achieved by adding 10% of $h_{t-1}$ to 90% of $g_{t-1}$ via vector addition. In other embodiments, the numbers 0.1 and 0.9 could be replaced by any other two real number a and b such that a+b=1.0.

There exist other more general methods for smoothly updating the mixing vector in this fashion to incorporate a dependence upon its values over previous time steps. One such class of methods is commonly referred to in neural network literature as "momentum update" methods and includes the particular method described in the previous paragraph immediately above. Another more general set of methods is commonly referred to in computational finance literature and electrical engineering literature as "moving average" methods. These and other useful methods readily apparent to the skilled artisan fall within the range of valid specifications for the mixing function.

Step 804 initializes variable E: the space of permissible mixing distributions. The range of valid specifications for E is precisely defined above in the section titled "Formal Definition of the Mixture of Policies Framework."

c) Initialize Time-dependent Memory Variables

Step 805 initializes variables to track the time t, the time step increment τ, and the memory variables $g_{t-\tau}$ and $s_{t-\tau}$ that remember the mixing function and stimulus for the previous time step, respectively.

d) Apply Mixing Function Module

Figure 9:
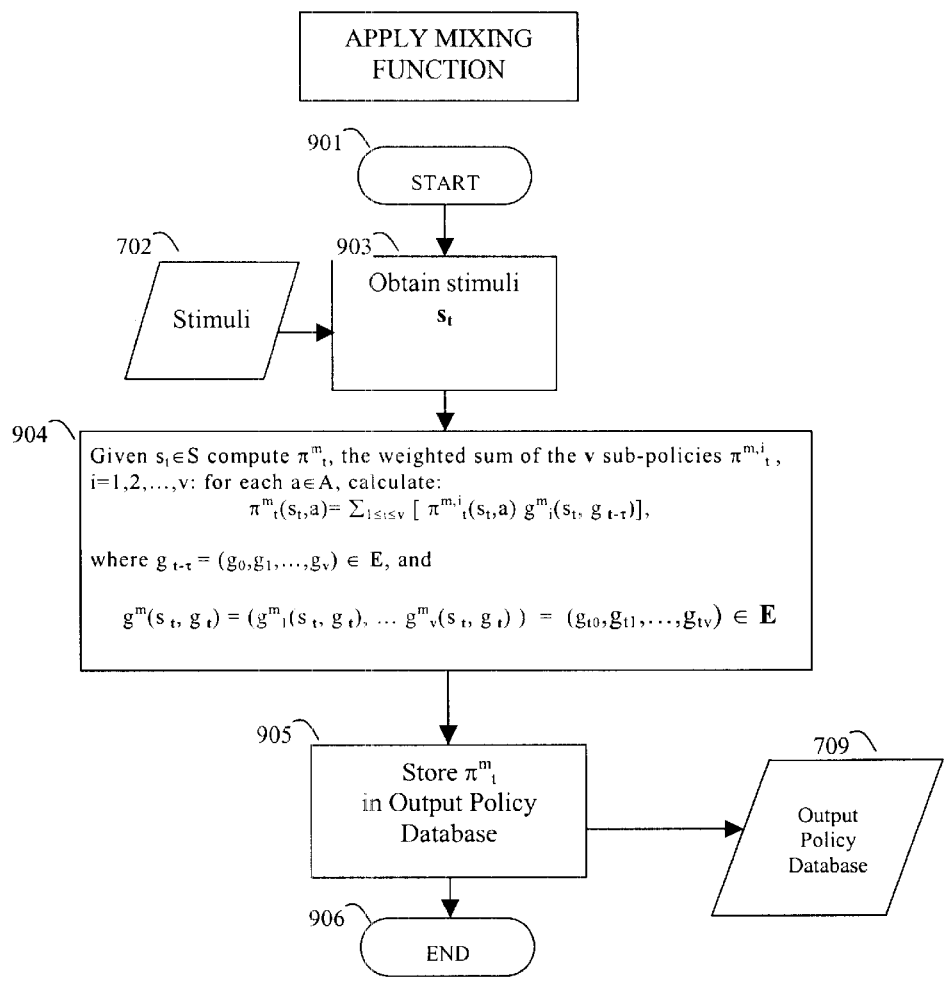
FIG. 9 is a flowchart of an operational sequence to combine a plurality of control policies in accordance with one embodiment of the invention.

Step 806 passes control to step 704 in FIG. 7, the module titled "APPLY MIXING FUNCTION." This module is described in further detail in FIG. 9. Referring to FIG. 9, the APPLY MIXING FUNCTION module begins in step 901 and continues to step 903, which retrieves stimuli $s_t$ from step 902. Step 904 computes the mixture of policies weighting for each action a in A. The mixing function g is computed according to the specification $g^m$ determined in step 803, taking the current stimulus $s_t$ and previous mixing value $g_{t-1}$ as its input parameters. Step 904 ensures that the resulting mixing value $g^m(s_t, g_{t-1})$ is in E and if not projects it to be the closest permissible value in E. Utilizing E to constrain the range of valid mixing values yields practical benefits, and methods for implementing this constraint will be apparent to the skilled artisan. In this embodiment we simply let $E=[0,1]^v$, thereby allowing all possible mixing values to be permissible.

Given current stimulus $s_t$, for each a in A step 904 computes $\pi^m_t(s_t,a)$. The set $\Pi_t = \{\pi^m_t(s_t,a), a\ \text{in}\ A\}$ comprises the (preliminary) Output Policy. This is considered the "preliminary" Output Policy because in practical application there may be conflicts that need to be resolved (this is handled in step 705). Step 905 stores this policy into the Output Policy Database. Step 906 exits the APPLY MIXING FUNCTION module and passes control to module 705, DETECT and RESOLVE CONFLICTS.

e) Detect and Resolve Conflicts Module

Figure 10:
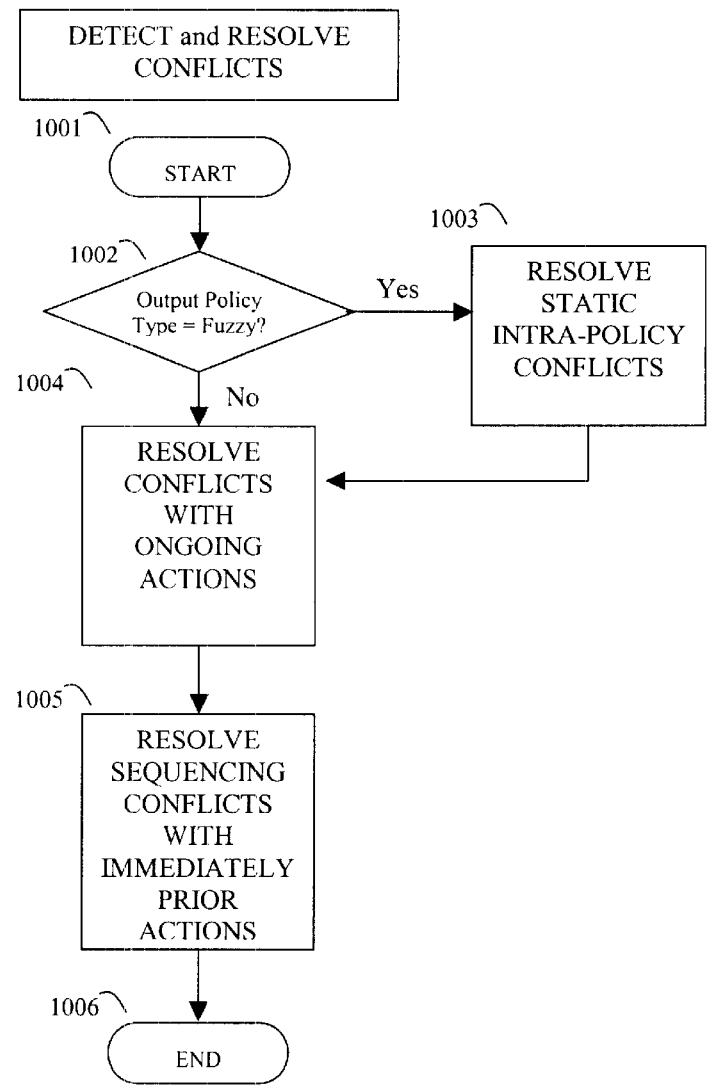
FIG. 10 is a flowchart of an operational sequence to combine a plurality of control policies in accordance with one embodiment of the invention.
Figure 11:
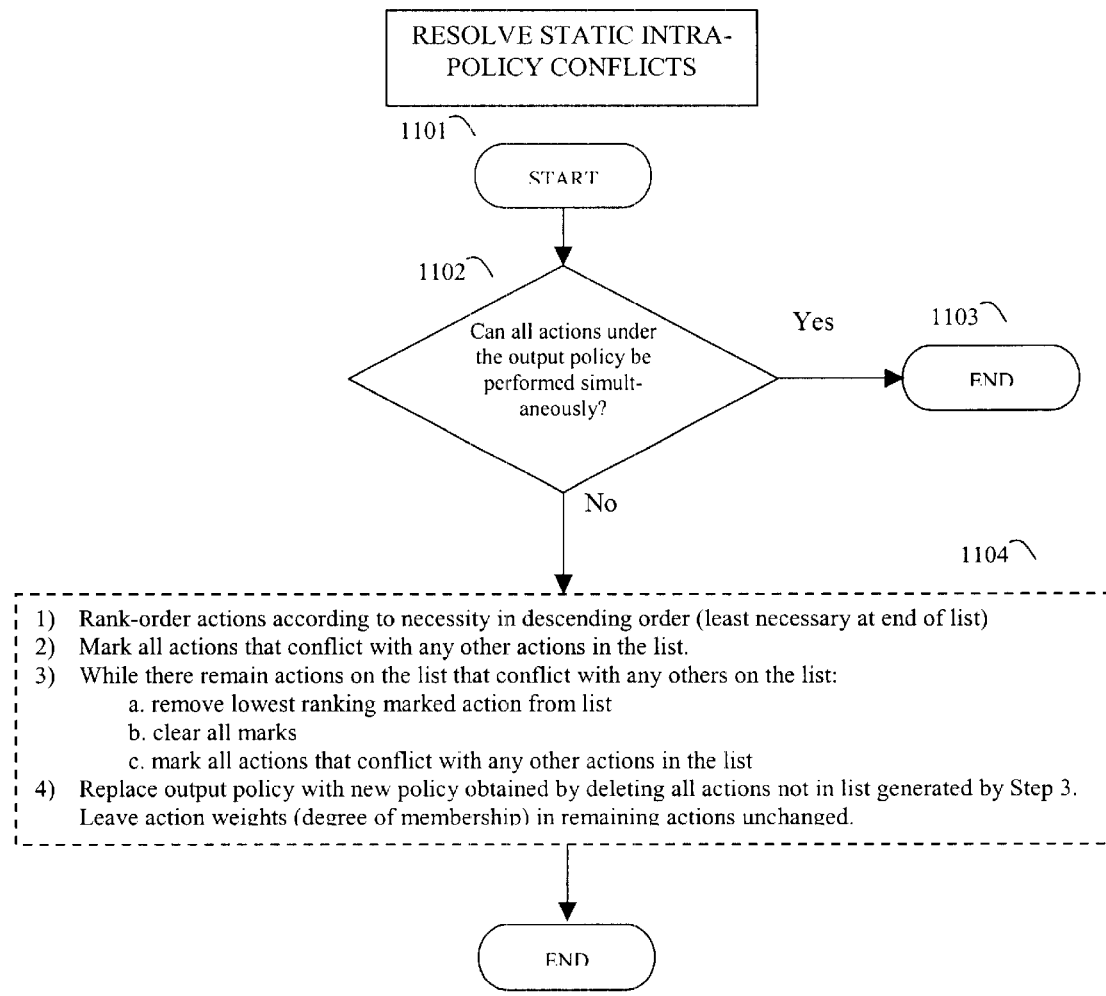

Module 705 is described in further detail in FIG. 10. Referring to FIG. 10, control enters the module in step 1001 and proceeds to step 1002. Step 1002 is a comparison operation that branches the flow of control depending upon the value of the variable set in step 802, the Output Policy Type. If the Output Policy Type is "Fuzzy" Step 1002 transfers control to step 1003, otherwise control is transferred to step 1004.

f) Resolve Static Intra-Policy Conflicts Module

Figure 1A:
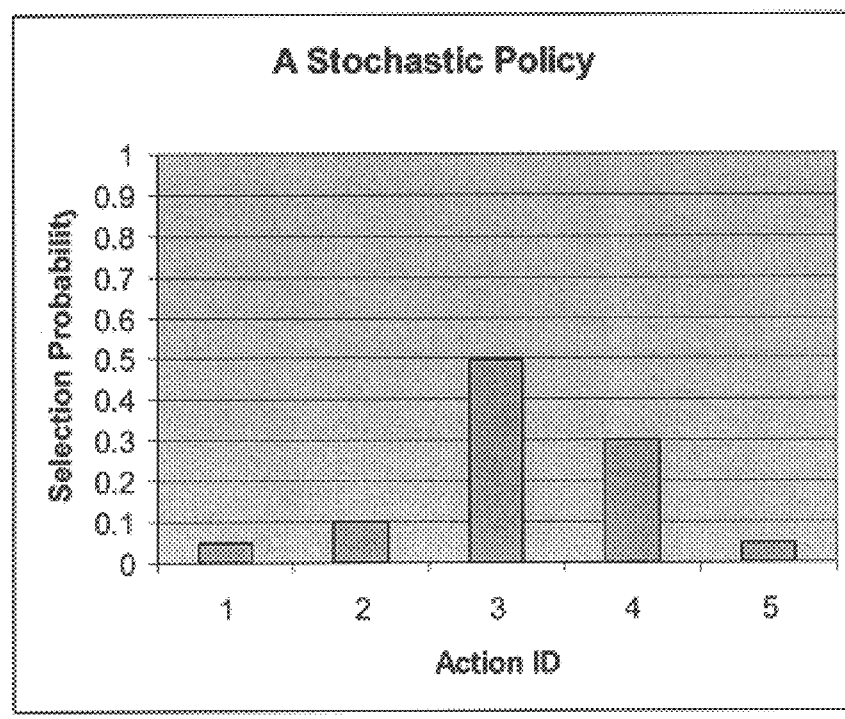
Figure 1B:
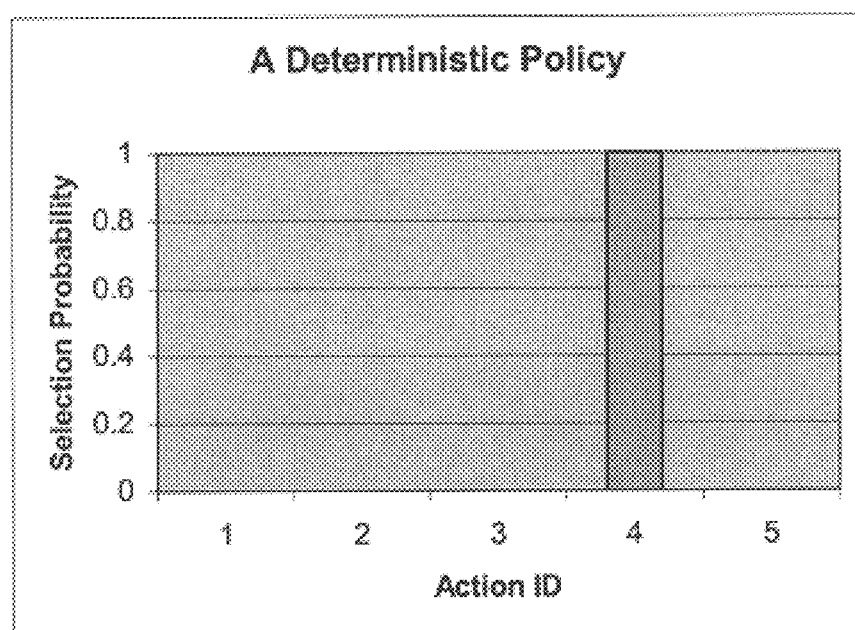
Figure 1C:
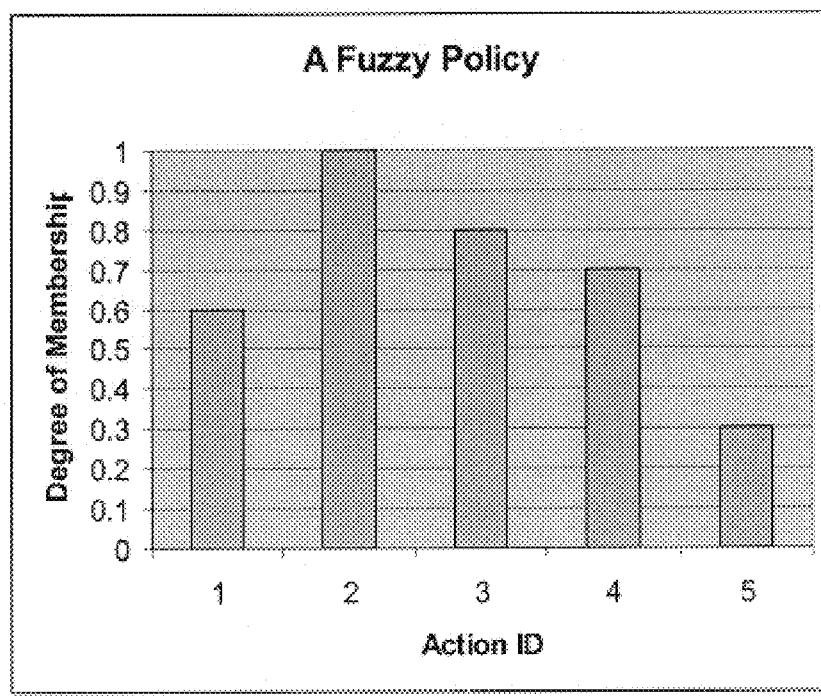
Figure 1D:
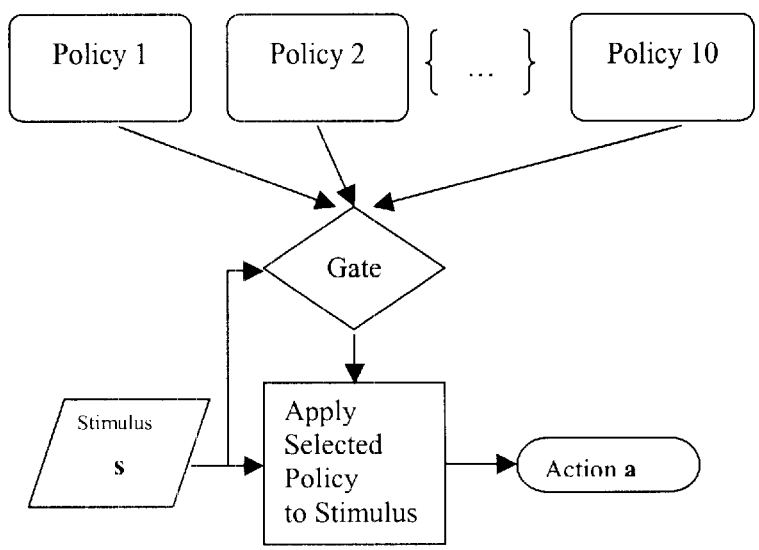
Figure 1E:
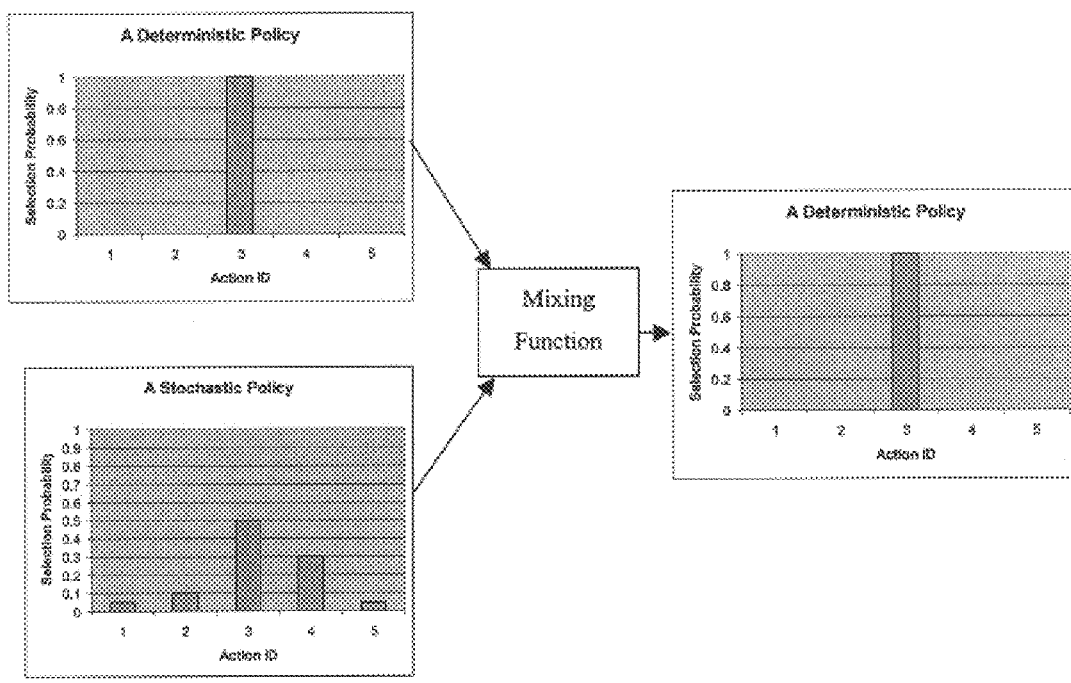
Figure 1F:
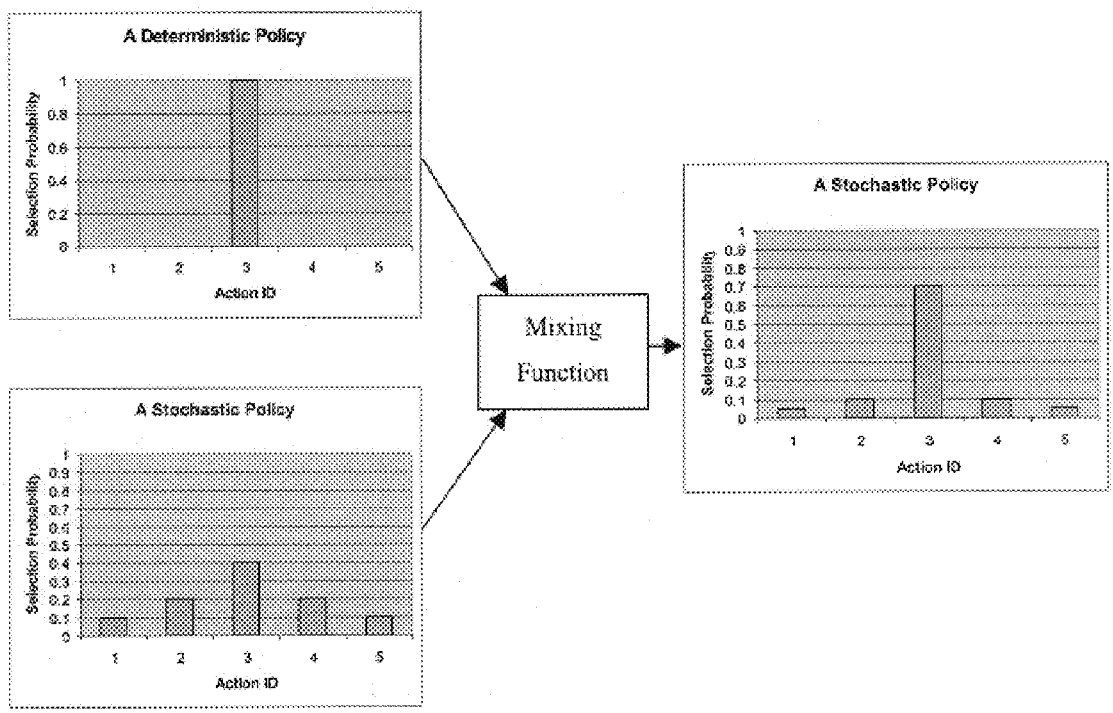
Figure 1G:
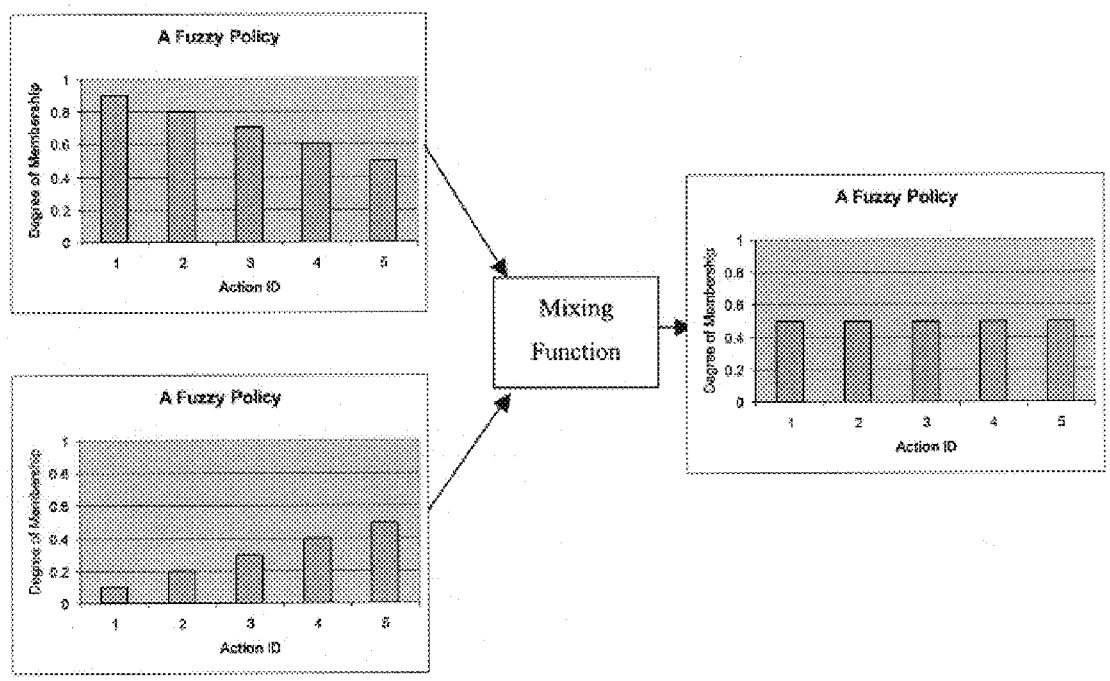
Figure 1H:
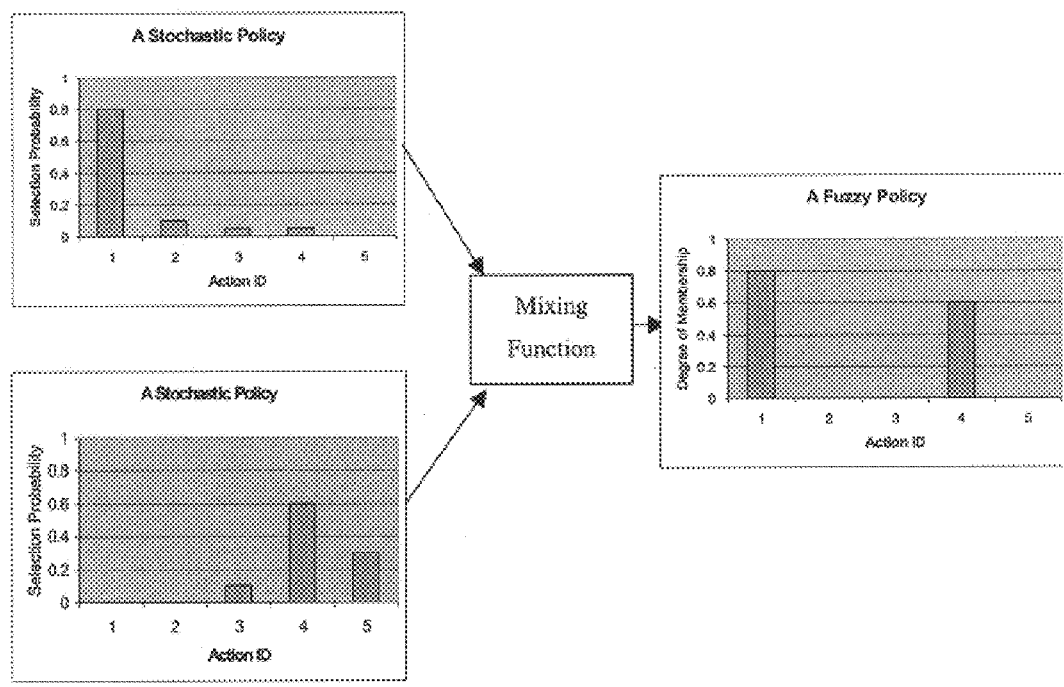
Figure 11:
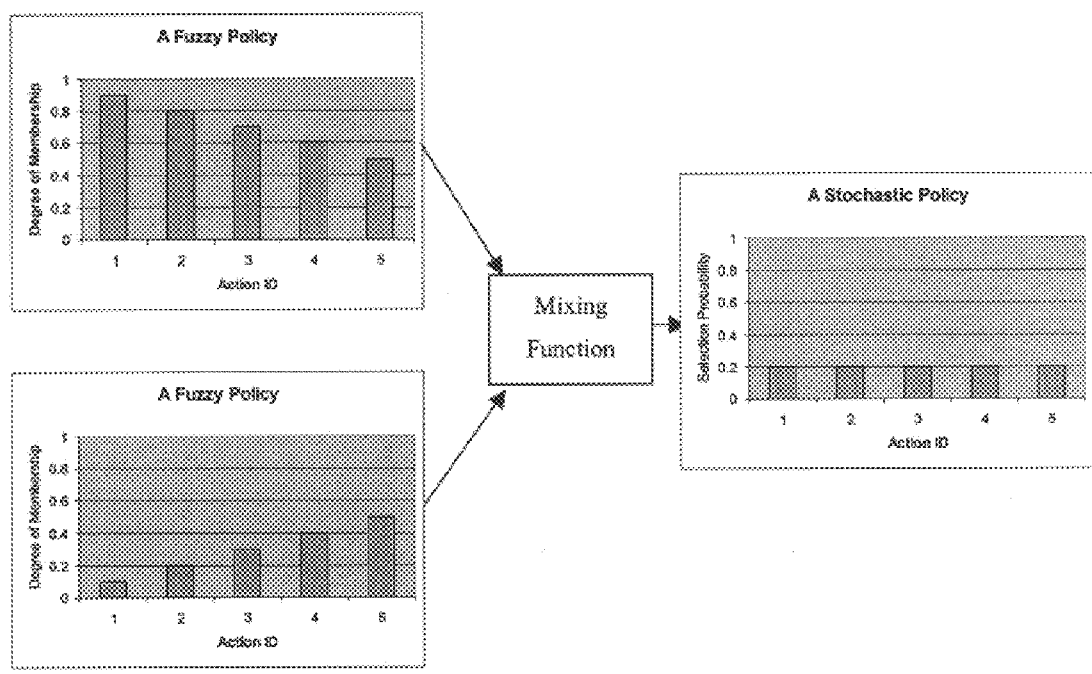
FIG. 11 is a flowchart of an operational sequence to combine a plurality of control policies in accordance with one embodiment of the invention.
Figure 1J:
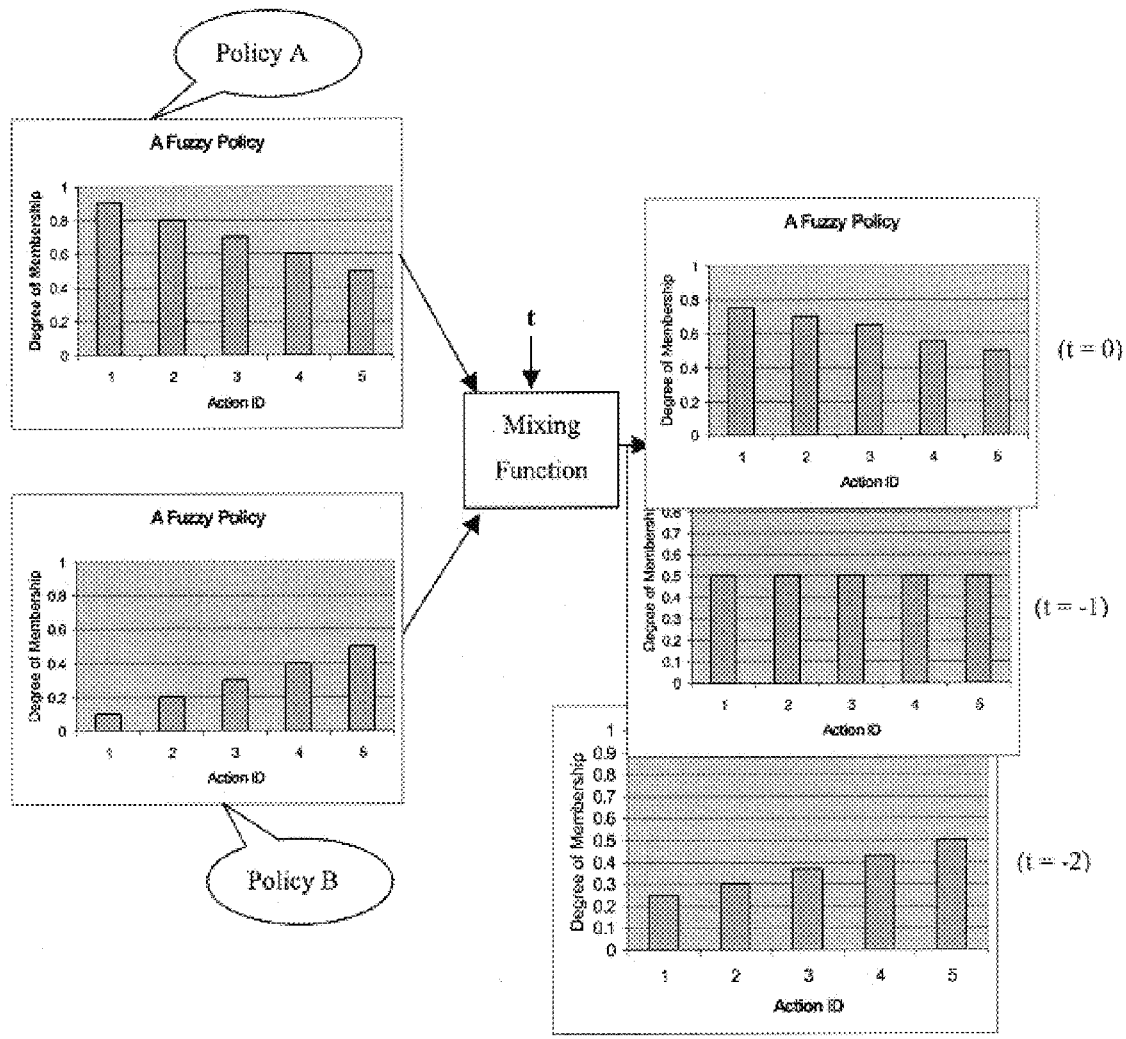

Step 1003 is module RESOLVE STATIC INTRA-POLICY CONFLICTS, which is described further in FIG. 11. Referring to FIG. 11, control enters the RESOLVE STATIC INTRA-POLICY CONFLICTS module in step 1101 and proceeds to step 1102. Step 1102 is a conditional branch that determines whether or not all actions in A can be performed simultaneously. A fuzzy policy can be used to trigger a plurality of actions in parallel, and actions triggered simultaneously can cause conflicts. Therefore, this step is appropriate because the branching condition in step 1002 "Output Policy Type=Fuzzy" took a value of TRUE, so the output policy type has been determined to be a fuzzy policy.

Step 1102 preemptively determines whether a set of actions $\{a_1, a_2, \ldots, a_n\}$ can be triggered simultaneously. The range of possibilities under which such conflicts can occur depends greatly upon the specific application. For example, some airplanes cannot move their left aileron up and the right aileron up at the same time. However, for ease of explanation and concreteness we describe a specific mechanism for implementing this step. Let P(A) be a set of subsets of A. If a subset $\{a_1, a_2, \ldots, a_n\}$ exists in P(A), then those n actions are permissible. Now create set $\{a_1, a_2, \ldots, a_n\}$ by examining $\Pi_t$ and identifying the actions a in A for which $\pi^m_t(s_t,a)$ is nonzero. For this embodiment, $\pi^m_t(s_t,a)=0$ implies that a is not triggered under $\Pi_t$. Next, determine whether $\{a_1, a_2, \ldots, a_n\}$ is in P(A). If it is, there is no conflict. If it is not, there is a conflict.

A skilled artisan may imagine applications for which this simple mechanism is either inadequate or inappropriate. Furthermore, a skilled artisan will create more sophisticated mechanisms for preemptively detecting conflicts among candidate actions. This may be done with a reactive controller (i.e., a controller such as a black box function that simply examines a set of actions and outputs a function 0 or 1 depending upon whether the actions can be triggered simultaneously or not) or with an algorithmic procedure. Either way, the result will be to determine whether all actions $\{a_1, a_2, \ldots, a_n\}$ that can be triggered under policy $\Pi_t$ can be performed simultaneously or not.

If all actions under the current output policy $\Pi_t$ can be performed simultaneously then there are no conflicts to resolve and control passes to step 1103, exiting the RESOLVE STATIC INTRA-POLICY CONFLICTS module and passing control to step 1004. Otherwise, control proceeds to step 1104. Step Step 1104 specifies a method for resolving the conflicts detected in step 1102. In general, the main responsibility of this step is to resolve conflicts by eliminating the possibility that two actions can be triggered which would cause a conflict if performed simultaneously. The four steps specified in step 1104 provide one embodiment for achieving this goal. The basic approach is to apply a linear order to all actions a in A. Let this linear order be denoted by $q(A)=(q_1, q_2, \ldots, q_M)$, where M=#A, the number of actions in A, and for i=1,2, ..., M, $q_i$ is an integer taking values in the range [0,M]. This linear order simply specifies which actions are preferable to others if forced to choose between conflicting actions. The active actions under policy $\Pi_t$ are sorted according to q(A) and the least important action that poses a conflict is deleted from $\Pi_t$ and policy $\Pi_t$ is updated to reflect this modification. If the new policy contains no conflicts then control passes to step 1105. Otherwise, this procedure is repeated until no conflicts remain under $\Pi_t$.

This conflict resolution strategy could be modified in a large number of ways depending upon the practical application and theoretical constraints. The skilled artisan would typically customize the procedure described here when applying this invention. For example, the procedure specified for this particular embodiment admits numerous variants that are apparent to the skilled artisan. For example, the linear order q(A) that assigns a measure of "importance" to each action could have additional dependencies. For example, it could depend upon time, it could depend upon the current stimulus, or it could depend upon the current output policy $\Pi_t$.

Upon performing the methods and procedures in step 1104 control is passed to step 1105, exiting this module and passing control to step 1004.

g) Resolve Conflicts with Ongoing Actions Module

Referring back to FIG. 10, if the branching condition in 1002 "Output Policy Type=Fuzzy" is not TRUE then control proceeds to step 1004, RESOLVE CONFLICTS WITH ONGOING ACTIONS. Or, control can also be passed to step 1004 from step 1003.

Figure 12:
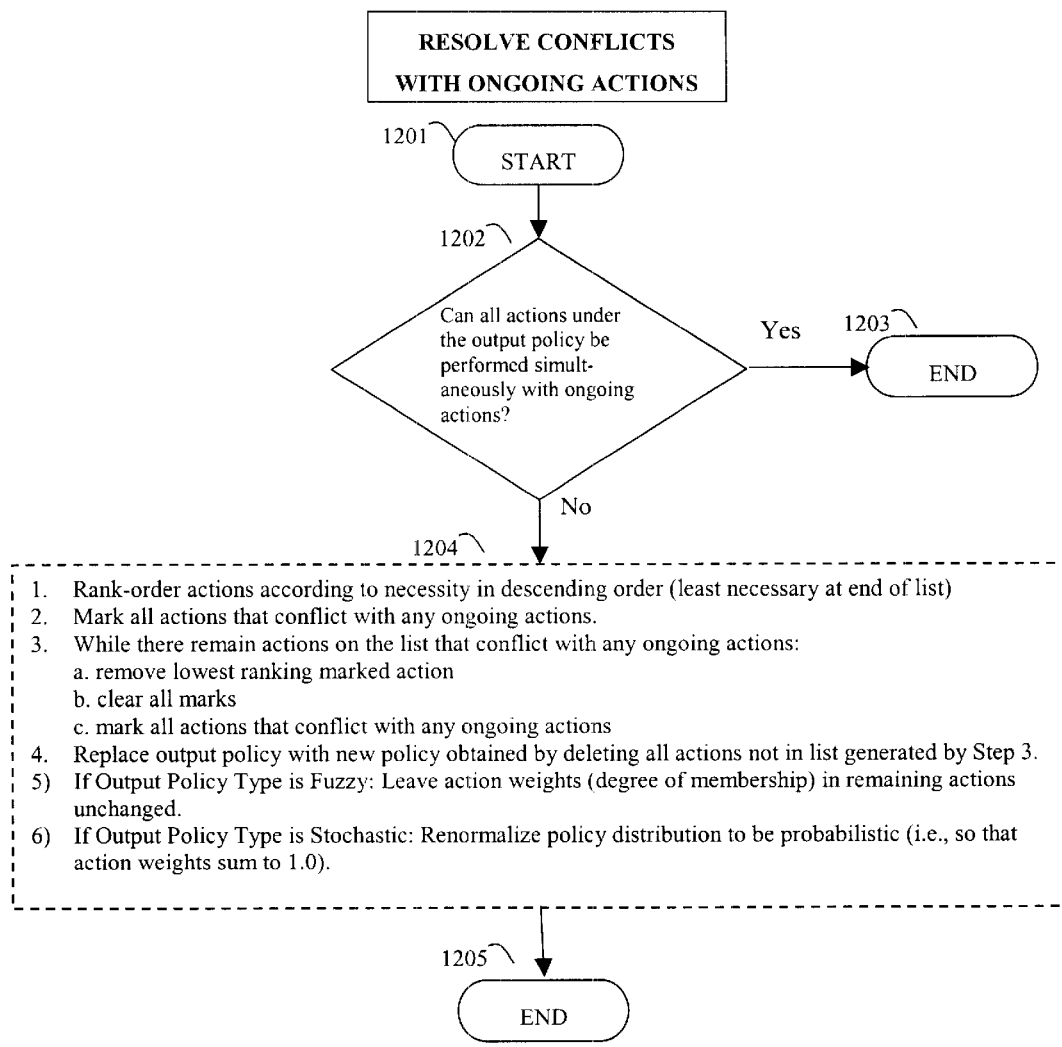
FIG. 12 is a flowchart of an operational sequence to combine a plurality of control policies in accordance with one embodiment of the invention.

Step 1004 is described further in FIG. 12. Referring to FIG. 12 control is initiated in step 1201 and proceeds to step 1202. Step 1202 performs methods and procedures for detecting conflicts that would arise if actions under the current output policy were to be performed simultaneously with ongoing procedures.

The RESOLVE CONFLICTS WITH ONGOING ACTIONS module of FIG. 12 is similar to the RESOLVE STATIC INTRA-POLICY CONFLICTS of FIG. 11. However, rather than handling conflicts between actions within the current output policy $\Pi_t$, it handles conflicts that will arise between actions under the current output policy $\Pi_t$ and other ongoing actions. These other ongoing actions could be initiated by server computer 400 during previous time steps under a previous policy (e.g., output policy $\Pi_{t-T}$, for some time t-T). Or these other ongoing actions could be outside of the control of server computer 400. Referring to FIG. 11, control enters the RESOLVE CONFLICTS WITH ONGOING ACTIONS module in step 1201 and proceeds to step 1202. Step 1202 is a conditional branch that determines whether or not all actions in A can be performed simultaneously with ongoing actions.

Let $\Pi_t$ be the current output policy, and let the set of actions $\{a_1, a_2, \ldots, a_n\}$ be those actions that can be triggered by $\Pi_t$. For ease of explanation we describe a specific mechanism for implementing step 1202. Let B represent the set of ongoing actions $\{b_1, b_2, \ldots, b_R\}$, where R is the number of ongoing actions. Let C=A×B give the Cartesian product of sets A and B. Let P(C) be a set of subsets of C. If a subset $\{a_1, a_2, \ldots, a_n, b_1, b_2, \ldots, b_R\}$ exists in P(C), then those n+R actions are permissible. Now create set $\{a_1, a_2, \ldots, a_n\}$ by examining $\Pi_t$ and identifying the actions a in A for which $\#^m_t(s_t,a)$ is nonzero. For this embodiment, $\pi^m_t(s_t,a)=0$ implies that a is not triggered under $\Pi_t$. (Note that this is true for stochastic policy as well.) Next:

1. if the output policy type is "Fuzzy" determine whether $\{a_1, a_2, \ldots, a_n, b_1, b_2, \ldots, b_R\}$ is in P(A). If it is, there is no conflict. If it is not, there is a conflict.

2. If the output policy type is "Stochastic" determine whether $\{a_1, b_1, b_2, \ldots, b_R\}$ is in P(A) for each i=1,2, .. . ,n. If this is so for each action under the output policy there is no conflict. Otherwise there is a conflict.

Note that we only need to determine whether a single action conflicts with ongoing actions for the stochastic policy, because a stochastic policy only triggers a single action at one time step. On the other hand, a fuzzy policy can simultaneously trigger a plurality of actions, so we need to check all combinations of actions under the output policy against ongoing actions.

A skilled artisan may imagine applications for which this simple mechanism is either inadequate or inappropriate and be able to create other mechanisms for preemptively detecting conflicts between candidate actions and ongoing actions. Regardless, the result will be to determine whether all actions $\{a_1, a_2, \ldots, a_n\}$ that can be triggered under policy $\Pi_t$ can be performed simultaneously with ongoing actions. If so, then control passes to step 1203, exiting the module and passing control to step 1005 because no conflict resolution is necessary. Otherwise, control proceeds to step 1204.

Step 1204 specifies a method for resolving the conflicts detected in step 1202. In general, the main responsibility of this step is to resolve conflicts by eliminating the possibility that actions that can be triggered by the current output policy would cause a conflict if performed simultaneously with ongoing actions. The six steps specified in step 1204 provide one embodiment for achieving this goal. The basic approach is similar to that specified for step 1104. We apply a linear order to all actions a in A. Let this linear order be denoted by $q(A)=(q_1, q_2, \ldots, q_M)$, where M=#A, the number of actions in A, and for i=1,2, . . . ,M, $q_i$ is an integer taking values in the range [0,M]. This linear order simply specifies which actions are preferable to others if forced to choose between conflicting actions. The active actions under policy $\Pi_t$ are sorted according to q(A) and the least important action that conflicts with an ongoing action is deleted from $\Pi_t$ and policy $\Pi_t$ is updated to reflect this modification. If the new policy contains no conflicts then control passes to step 1205. Otherwise, this procedure is repeated until no conflicts remain under $\Pi_t$ given the current ongoing actions.

This conflict resolution strategy could be modified in a number of ways depending upon the practical application and theoretical constraints. The skilled artisan would typically customize the procedure described here when applying this invention. For example, the procedure for this particular embodiment admits numerous variants that are apparent to the skilled artisan. For example, the linear order q(A) that assigns a measure of "importance" to each action could have additional dependencies. For example, it could depend upon time, it could depend upon the current stimulus, or it could depend upon the current output policy $\Pi_t$. Furthermore, if server computer 400 has the capability to abort ongoing actions, then another strategy is to selectively abort ongoing actions until ongoing actions present no imminent conflict with the current output policy. Additionally, hybrid schemes are possible which selectively abort some ongoing actions as well as delete actions from the current output policy.

Upon performing the methods and procedures in step 1204 control is passed to step 1205, exiting this module and passing control to step 1005.

h) Resolve Sequencing Conflicts With Immediately Prior Actions Module

Figure 13:
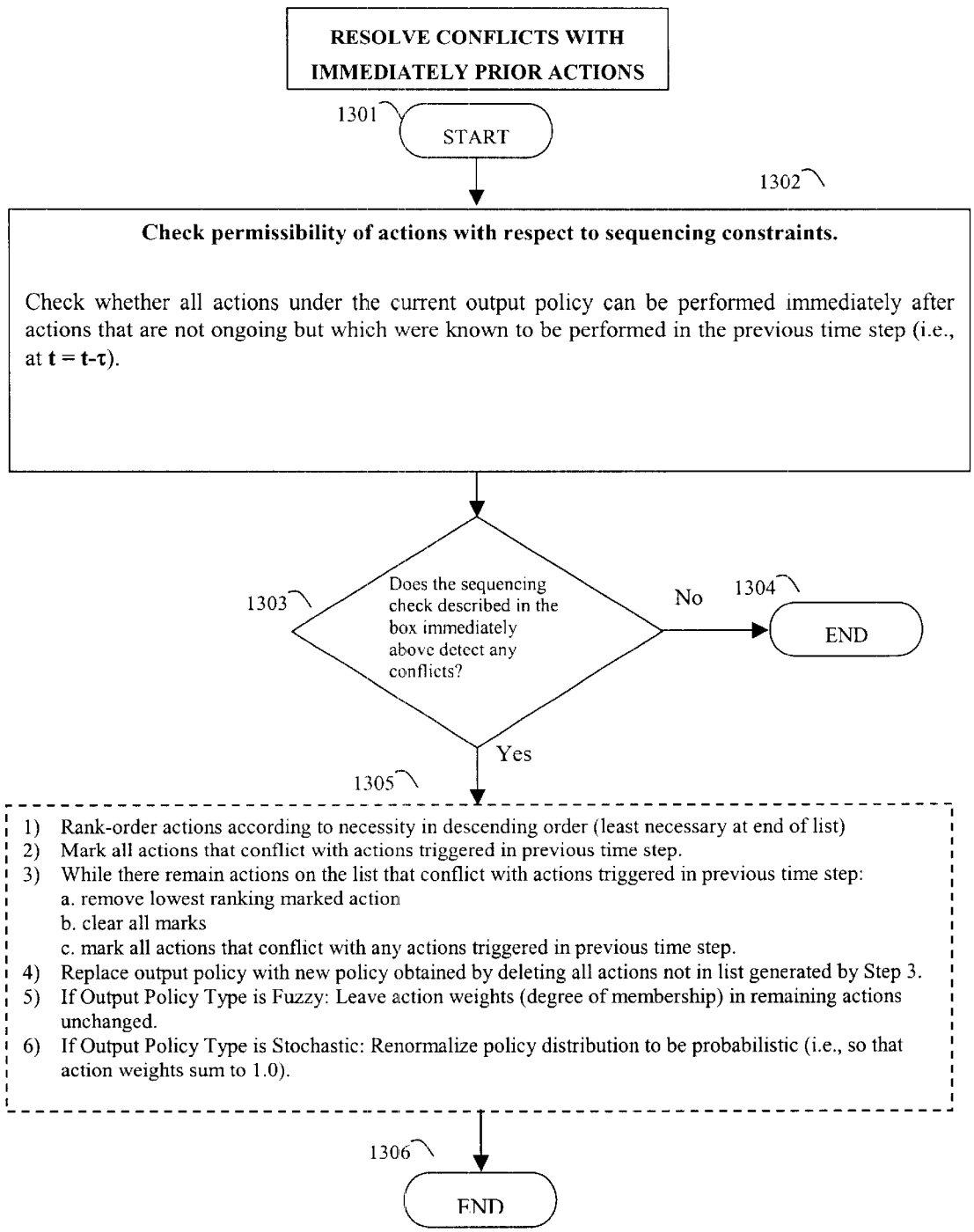
FIG. 13 is a flowchart of an operational sequence to combine a plurality of control policies in accordance with one embodiment of the invention.

Step 1005, RESOLVE SEQUENCING CONFLICTS WITH IMMEDIATELY PRIOR ACTIONS, is described in further detail in FIG. 13. Referring to FIG. 13, the module starts in step 1301 and proceeds to step 1302.

In this embodiment, actions that have the potential to create conflicts with future actions are labeled as "ongoing" actions until they have completed. This information is stored in Program Memory 711. This way conflicts created by these actions can be detected by the procedure titled "RESOLVE CONFLICTS WITH ONGOING ACTIONS". However, it is possible for some conflicts caused by actions triggered in the immediately prior step to be missed due to timing effects. This sequencing permissibility check catches those sequencing conflicts that are missed due to timing effects.

The embodiment for this module is exactly analogous to that for step 1004, the RESOLVE CONFLICTS WITH ONGOING ACTIONS module. The steps required are:

1. Consult Program Memory 711 to determine which action(s) were triggered at the previous time step (by the executive in accordance to the output policy recommendation for that time step). If these actions were not in the set of ongoing actions handled in step 1004, treat them as if they are actually ongoing actions.
2. Resolve conflicts using method directly analogous to step 1004, the RESOLVE CONFLICTS WITH ONGOING ACTIONS module.

This treats actions triggered during the immediate time step as "ongoing actions" regardless of whether or not they are detectable by any other means as ongoing actions, for it is possible that they are still in process of being initiated.

If step 1302 detects no potential for conflict between the current policy and ongoing actions then step 1303 passes control to step 1304, exiting this module. Otherwise, control passes to step 1305. Step 1305 contains a method for resolving the conflicts detected in steps 1302 and 1303. Step 1305 is exactly analogous to step 1204. Note that the 6 steps described in step 1305 in FIG. 13 reuse the same 6 steps described for step 1204 in FIG. 12.

When step 1305 is completed control passes to step 1306, which exits the RESOLVE SEQUENCING CONFLICTS WITH IMMEDIATELY PRIOR ACTIONS module, and transfers control to step 1006, exiting the DETECT and RESOLVE CONFLICTS module, and transferring control to step 706, the OUTPUT POLICY RESULT module.

i) Output Policy Result Module

Figure 14:
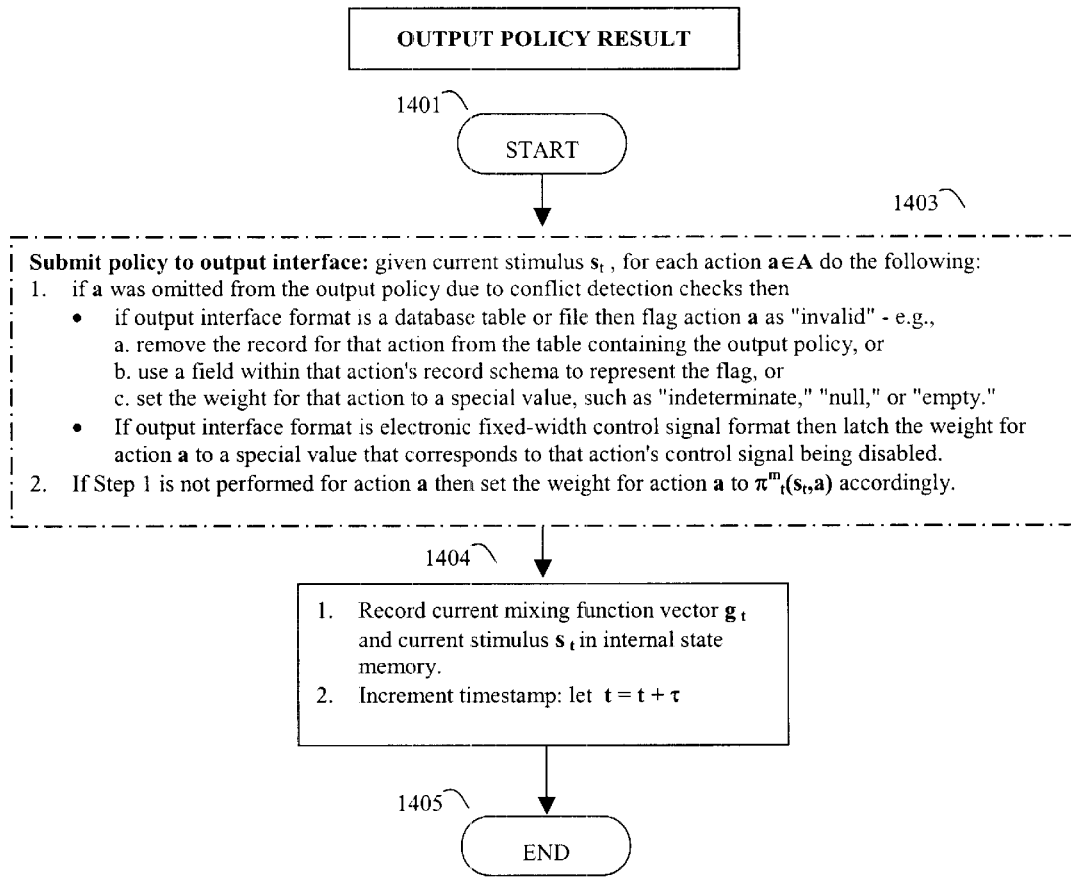
FIG. 14 is a flowchart of an operational sequence to combine a plurality of control policies in accordance with one embodiment of the invention.

This module is described further in FIG. 14. Referring to FIG. 14 control enters step 1401 and proceeds to step 1403, which stores the updated version of the current output policy $\Pi_t$ to the Output Policy Database 709. Step 1404 records the value of current memory variables that are required for the next time step within the Program Memory 711. Control proceeds to step 1405, exiting this procedure and transferring control to step 707 in FIG. 7.

j) Continue?

Step 707 contains a stopping mechanism to determine whether to continue or exit. If continuing then control proceeds to step 704, otherwise, it proceeds to step 708. The general method ends in step 708.

2. Other Embodiments will be Apparent to Skilled Artisans

While what have been shown are considered to be the preferred embodiments of the invention, it will be apparent to those skilled in the art that various changes and modifications can be made herein without departing from the scope of the invention as defined by the appended claims.

In particular, specific steps which admit a variety of alternative embodiments too numerous to specify here but which are apparent to the skilled artisan include the following steps:

1. Steps 102 and 1104
2. Steps 1202 and 1204
3. Step 1302 and 1305
4. Step 1403.

These steps are related in that they are involved in conflict detection or conflict resolution. In practical applications there may be an uncountable number of particular methods for detecting conflicts or resolving conflicts that may arise. Different embodiments of this invention may utilize different conflict management schemes. Regardless of the particular conflict management scheme used in the resulting machine, the signal processing system comprised by the machine may contain: (a) A module encapsulating the conflict management duties, and separating them from policy formulation and policy execution. (b) A method for leveraging the availability of a plurality of overlapping policies in order to help detect and resolve policy conflicts before handing a control policy off to an executive for execution.

Also, the skilled artisan will understand that the general method allows the applicability of the theory of functionals, also known as "distributions" or "generalized functions" as described in Chapter 9 of [Folland 1984]. This theory provides several general methods for combining distributions. The skilled artisan will understand how such methods can be implemented under the general method of this invention. Distributions in this general sense resemble functions but are more singular. See for instance the discussion in [Folland 1984] of "tempered distributions" and methods for composing a distribution from a plurality of tempered distributions.

8. CONCLUSION, RAMIFICATIONS, AND SCOPE OF INVENTION

Thus the reader will see that the invention provides a highly flexible method that can be used by skilled artisans to combine a plurality of policy-based controllers, or to combine a plurality of policy-based process servers. The invention can also be used skilled artisans to provide policy-based controllers and policy-based process servers with better regime-switching capability—i.e., the ability to detect that the environment has switched into a different operating regime and to smoothly respond to that new operating regime. The method also provides the means to improve the conflict management aspects of policy-based control by encapsulating conflict management duties appropriately for policy-based control.

While the description above contains many specificities, these should not be construed as limitations on the scope of the invention, but rather as an exemplification of one preferred embodiment thereof. Many other variations are possible.

For example

1. Alternative embodiments of the conflict detection methods utilized in steps 1102, 1202, and 1301, which may draw upon different sources of information for preemptively determining whether a candidate action can pose a conflict downstream once initiated, for example Simulating the effect of selecting an action using a procedure that simulates the effects of the action upon the controlled system (say, for example, via a virtual reality interface, or by a physical system simulator such as a finite elements model) and using the results of the simulation to identify possible conflicts, Using a statistical function to predict the probability of conflict of a given action or set of actions, and then applying a conflict resolution strategy to a set of actions if their estimated probability of causing a conflict exceeds some threshold.

2. Alternative embodiments of conflict resolution methods utilized in steps 1104, 1204 and 1305, which may Use a different quantitative measure for assigning relative importance to candidate actions, Use a different sorting mechanism for sorting actions into a linear order depending upon their relative importance, Use a different method for resolving conflicts by modifying actions rather than deleting them, Use a different method for deleting actions, e.g., deleting more than one at a time, 3. Various means to post the results of the general method to an output interface of step 1403 or to flag actions as "inactive."

4. Usage of different number of sub-policies 301–303 in FIG. 3, or of different numbers of policy recommendations in Policy Database 404, or of different numbers of Control policies in Controller Policy Interface 414.

5. Usage of fuzzy policies (as defined here) in order to implement a method of combining a plurality of value functions into a single output value function, which is then given to a method that converts the output value function into a control policy.

Such variations are apparent to the skilled artisan with the benefit of this detailed description. Accordingly, the scope of the invention should be determined not by the embodiments illustrated, but by the appended claims and their legal equivalents.

9. REFERENCES

A. Patent References

U.S. Patent Documents: no relevant patents located.

B. Other Publications

1. Timothy W. Cacciatore and Steven J. Nowlan. "Mixtures of Controllers for Jump Linear and Nonlinear Plants." 1994. In J. D. Cowan, Gerald Tesauro, and Joshua Alspector, editors, Advances in Neural Information Processing Systems 6, San Mateo, Calif. Morgan Kaufmann.
2. Robert H. Crites. 1996. "Large-scale dynamic optimization using teams of reinforcement learning agents." Doctoral dissertation. University of Massachusetts, Amherst.
3. Peter Dayan and Geoffrey E. Hinton. "Feudal reinforcement learning."1993. In S. J. Hanson, J. D. Cowan, and C. L. Giles, editors, Advances in Neural Information Processing Systems 5, San Mateo, Calif. Morgan Kaufmann.
4. Thomas Dietterich. "Hierarchical reinforcement learning with the MAXQ value function decomposition." 1997. Technical report. Department of Computer Science. Oregon State University, Corvalis, Oreg. 97331.
5. Thomas G. Dietterich and Nicholas S. Flann. Explanation-based learning and reinforcement learning: {A} unified view. 1997. Machine Learning. Vol. 28, no.2, pp.169–210.
6. M. Dorigo and M. Colombetti. "Robot shaping: Developing autonomous agents through learning." 1994. Artificial Intelligence, 71(2):321–370, December 1994.
7. Marco Dorigo. "Alecsys and the AutonoMouse: Learning to control a real robot by distributed classifier systems." 1995. Machine Learning, 19.
8. Gerald Folland. 1984. Real Analysis. Wiley. New York.
9. R. A. Jacobs, M. I. Jordan, S. J. Nowlan, and G. E. Hinton. "Adaptive Mixtures of Local Experts." 1994. Neural Computation.
10. Leslie Pack Kaelbling, Michael L. Littman, and Andrew W. Moore. 1996. Reinforcement Learning: A Survey. Journal of Artificial Intelligence Research, volume 4, pp. 237–285. Web site preview version available at: http://www.cs.brown.edu/people/lpk/rl-survey/rl-survey.html
11. Long-Ji Lin. "Hierachical learning of robot skills by reinforcement." 1993. In Proceedings of the International Conference on Neural Networks.
12. Pattie Maes and Rodney A. Brooks. "Learning to coordinate behaviors." 1990. In Proceedings Eighth National Conference on Artificial Intelligence, pages 796–802. Morgan Kaufmann.
13. Sridhar Mahadevan and Jonathan Connell. "Scaling reinforcement learning to robotics by exploiting the subsumption architecture." 1991. Proc. of the $8^{th}$ International Workshop on Machine Learning, pp. 328–332.
14. Patricia Morreale. "Agents on the Move." 1998. IEEE Spectrum magazine. April 1998, pp. 34–41.
15. Nowlan, Steven J. "Competing Experts: An experimental Investigation of Associative Mixture Models." 1990. Technical Report CRG-TR-90-5, Department of Computer Science, University of Toronto.
16. Hyacinth S. Nwana and Nader Azermi. Software Agents and Soft Computing: towards enhancing machine intelligence. 1997. Springer-Verlag, Berin/Heidelberg.
17. Richard Sutton. "Reinforcement learning is direct adaptive optimal control." IEEE Control Systems Magazine. Vol.12, issue 2, pp. 19–22, April 1992.
18. Richard S. Sutton and Andrew G. Barto. Reinforcement Learning: an introduction. 1998. MIT Press.

What is claimed is:

1. A method of combining a plurality of input control policies, comprising:

(a.) providing a first input information transmitting device representing an input control stimulus, (b.) providing a second input information transmitting device representing a plurality of input control policies, (c.) providing an output information transmitting device representing an output control policy, (d.) combining said input control policies into said output control policy, such that more than one said input control policy may simultaneously influence said output control policy for said input control stimulus, (e.) transmitting said output control policy via said output information transmitting device, whereby said method will combine said input control policies by functional composition to obtain a single output control policy, whereby more than one said input control policies are able to simultaneously influence the said output control policy for the said input control stimulus, whereby said method can iterate over time, whereby said method will allow said output control policy to smoothly transition control from being influenced substantially by one of said input control policies to being influenced by substantially another of said input control policies, whereby said method will allow said output control policy to smoothly transition control from being influenced substantially by one particular functional composition of said input control policies to being influenced substantially by another functional composition of said input control policies, whereby said method will allow the combination of a plurality of input control policies for the purpose of consolidating that information into a form suitable for use by a policy-based "action selection executive" (i.e., a policy-based "controller").

2. The method recited in claim 1, further including (a.) providing an information storage device which is able to store the plurality of input control policies recited in claim 1, (b.) means for storing the plurality of input control policies recited in claim 1 into said information storage device, (c.) retrieving the plurality of input control policies recited in claim 1 from said information storage device and making this information available to the method recited in claim 1 via the second input information transmitting device recited in claim 1, whereby said method may be encapsulated thereby allowing physical separation of input control policies and the information generating devices that generated the input control policies.

3. The method recited in claim 1, further including (a.) providing an information storage device which is able to store the input control stimulus recited in claim 1, (b.) storing the input control stimulus recited in claim 1 into said information storage device, (c.) retrieving said input control stimulus from said information storage device and making this information available to the method recited in claim 1 via the first input information transmitting device recited in claim 1, whereby said method may be encapsulated thereby allowing physical separation of input control stimuli and the information generating devices that generated the input control stimuli.

4. The method recited in claim 1, further including (a.) providing an information storage device which is able to store the output control policy recited in claim 1, (b.) storing said output control policy into said information storage device, (c.) retrieving said output control policy from said information storage device and making this information available externally via said output information transmitting device representing a persistent copy of the output control policy recited in claim 1, whereby said method may be encapsulated thereby allowing physical separation of the method and the information processing devices that utilize the output control policy.

5. The method recited in claim 1, further including (a.) providing an action distribution input information transmitting device capable of identifying a plurality of actions, (b.) providing an information processing device capable of applying a control policy to said plurality of actions and selecting a single output action from said plurality of actions, (c.) providing an action output information transmitting device capable of describing or identifying an action, (d.) utilizing said information processing device to the task of selecting an output action from said plurality of actions via said action distribution input information transmitting device according to the output control policy recited in claim 1, (e.) transmitting said action via said output information transmitting device, whereby said method may be utilized to select said output action from said plurality of actions described or identified by said input information transmitting device, whereby the said selection of output a from the said plurality of actions depends upon the output control policy, whereby said selection can occur repeatedly over time, whereby said method may be utilized as a controller by using it to select said output action in a fashion dependant upon said input control policies and make this selection externally available, whereby said method may be utilized as a stochastic controller.

6. The method recited in claim 5, further including (a.) providing an action distribution input information storage device capable of containing a description of a plurality of actions, (b.) storing a description of said plurality of actions into said action distribution input information storage device, (c.) retrieving said descriptions of said plurality of actions from said action distribution input information storage device and making this information available to the method recited in claim 5, whereby said method may be encapsulated thereby allowing physical separation of the method and the information processing devices that utilize said method as a controller, whereby said method may be encapsulated thereby allowing physical separation of the method and the information processing devices that generate input control policy information that is provided as input to the method, whereby information representing or identifying actions referred to by the method or controlled by the method can be maintained and utilized internally within the method, whereby said method may be utilized as a stochastic controller and cleanly encapsulated as a distinct information processing system.

7. The method recited in claim 1, further including (a.) providing an action distribution input information transmitting device capable of identifying a plurality of input actions, (b.) providing an information processing device capable of applying the output control policy recited in claim 1 to said plurality of input actions and selecting a plurality of output actions from said plurality of input actions, (c.) providing a fuzzy action distribution output information transmitting device capable of describing a plurality of output actions, (d.) utilizing said information processing device to the task of selecting a plurality of output actions from said plurality of input actions via said action distribution output information transmitting device according to the output control policy recited in claim 1, (e.) transmitting said plurality of output actions via said fizzy action distribution output information transmitting device, whereby said method may be utilized to select a plurality of output actions from a plurality of input actions described or identified by said action distribution input information transmitting device, whereby the said selection of plurality of output actions from the said plurality of input actions depends upon the output control policy recited in claim 1, whereby said selection can occur repeatedly over time, whereby said method may be utilized as a controller by using it to select a plurality of output actions in a fashion dependant upon said input control policies and make this selection externally available, whereby said method can be utilized as a fuzzy controller.

8. The method recited in claim 7, further including (a.) providing an input information storage device capable of containing a description of a plurality of stored input actions, (b.) storing a description of said plurality of stored input actions into said information storage device, (c.) retrieving said descriptions of said plurality of stored input actions from said information storage device and making this information available to the method recited in claim 7, whereby said method may be encapsulated thereby allowing physical separation of the method and the information processing devices that utilize said method as a controller, whereby said method may be encapsulated thereby allowing physical separation of the method and the information processing devices that generate input control policy information that is provided as input to the method, whereby information representing or identifying actions referred to by the method or controlled by the method can be maintained and utilized internally within the method, whereby said method can be utilized as a fuzzy controller and cleanly encapsulated as a distinct information processing system.

9. The method recited in claim 1, further including (a.) detecting potential conflicts that may arise from use of output control policy to drive action selection policy, such that such conflicts can be determined by processing information available within said output control policy, (b.) resolving said potential conflicts by modification of the output control policy, whereby said method will detect conflicts that may arise from combining said plurality of input control policies recited in claim 1 and which are evident by examining the output control policy, whereby said method will modify said output control process to free of said conflicts.

10. The method recited in claim 1, further including (a.) detecting potential conflicts that may arise from use of output control policy to drive action selection policy in the presence of ongoing actions detectable by the method, (b.) resolving said potential conflicts by modification of the output control policy, whereby said method will detect conflicts that may arise from combining said plurality of input control policies recited in claim 1 and which could trigger conflicts with ongoing actions, whereby said method will modify said output control process to be free of said conflicts.

11. The method recited in claim 1, further including (a.) detecting potential conflicts that may arise from use of output control policy to drive action selection policy given actions previously triggered by the method as a result of operation thereof over previous iterations, (b.) resolving said potential conflicts by modification of the output control policy, whereby said method will detect conflicts that may arise from combining said plurality of input control policies recited in claim 1 and which could trigger conflicts with actions previously triggered by the method or as a result of its operation, whereby said method will modify said output control process to be free of said conflicts.

12. The method recited in claim 1, further including (a.) detecting potential conflicts that may arise from use of output control policy to drive action selection policy in the presence of ongoing actions detectable by the method, (b.) resolving said potential conflicts by aborting or modifying one or more ongoing actions, whereby said method will detect conflicts that may arise from combining said plurality of input control policies recited in claim 1 and which could trigger conflicts with ongoing actions, whereby said method will resolve said conflicts by modifying or aborting the offending ongoing actions.

13. The method recited in claim 1, further including (a.) detecting potential conflicts that may arise from use of output control policy to drive action selection policy given actions previously triggered by the method as a result of operation thereof, (b.) resolving said potential conflicts by modifying or aborting previously triggered actions, whereby said method will detect conflicts that may arise from combining said plurality of input control policies recited in claim 1 and which could trigger conflicts with actions previously triggered by the method or as a result of its operation, whereby said method will resolve such conflicts by modifying or aborting offending previously triggered actions.

14. The method recited in claim 5, further extending the method to apply to a multitude of actions,
   (a.) providing an input information storage device capable of containing a plurality of descriptions of policy information for a multitude of actions, each said description of policy information contained in said plurality of descriptions of policy information represented as a compact statistic,
   (b.) storing said plurality of input control policies into said information storage device,
   (c.) retrieving said compact statistics from said information storage device and transmitting to said method,
   (d.) combining said plurality of compact statistics such that the plurality of input control policies represented as compact statistics can be combined,
      whereby said method can be applied to large action sets.

15. The method recited in claim 6, further extending the method to apply to a multitude of actions,
   (a.) providing an input information storage device capable of containing a plurality of descriptions of policy information over a multitude of actions, each said description of policy information contained in said plurality of descriptions of policy information represented as a compact statistic,
   (b.) storing said input control policies into said information storage device,
   (c.) retrieving said compact statistics from said information and transmitting to said method,
   (d.) combining said plurality of compact statistics such that the plurality of input control policies represented as compact statistics can be combined,
      whereby said method can be applied to large action sets.

16. The method recited in claim 1 further extending the method to apply hierarchically to the results of a plurality of applications of the method,
   (a.) providing a plurality of server information processing devices capable of implementing said method,
   (b.) providing a master information processing device capable of implementing said method,
   (c.) interconnecting said server information processing devices to said master information processing device,
      whereby said method can be applied by using as input the plurality of outputs as computed by distinct instances of said method in a hierarchical manner,
      whereby said method can be applied in a hierarchical fashion using a plurality of hierarchical levels,
      whereby said method can apply different embodiments of the invention at different levels within the hierarchy.

17. The method recited in claim 1 further extending the method to apply recursively to the results of a plurality of applications of the method,
   (a.) providing an information processing device capable of implementing said method,
   (b.) providing an information storage device capable of storing output results of said information processing device as applied to computing said method,
   (c.) storing said output results from information processing device into said information storage device,
   (d.) retrieving said output results from said information storage device into said information processing device,
   (e.) applying information storage device to the task of computing a plurality of implementations of the method,
      whereby said method can be applied recursively to compute a plurality of instances of said method,
      whereby said plurality of instances of said method can be computed and stored for subsequent use as input to a subsequent instance of said method.

18. An article of manufacture comprising a data storage medium tangibly embodying a program of machine-readable instructions executable by a digital processing apparatus to perform method steps for combining policy information, the method steps comprising:
   (a.) Identifying v sub-policies at time t: $\{\pi^{m,i}_t\}$, i=1, 2, ... ,v, where $\pi^{m,i}_t$ is the policy function for the $i^{th}$ sub-policy at time t, for t=0, 1, 2, ... ,
   (b.) Specifying a set of actions A where the number of actions in A is denoted by #A and actions in A are denoted by a∈A, and specifying a stimulus $s_t \in S$,
   (c.) Specifying a set of permissible mature distributions over v-dimensional policy space: $E \subset I^v$, where I is the real-valued interval from 0 to 1 inclusive (i.e., including 0 and 1 as endpoints), and $I^v$ is the v-dimensional space obtained by taking cross-products of I,
   (d.) Specifying a v-dimensional "recursive mixing function" $g^m$: S×E→E, such that for the stimulus $s_t \in S$, and mixing value h∈E, $g^m(s_t,h) \in E$, where each dimension of said $g^m(\cdot,\cdot)$ is denoted by $g^m_i(\cdot,\cdot)$, i=1,2,... ,v,
   (e.) Specifying a value of the recursive mixing function at the previous time step t−1 represented by the recursive function $h_t = g^m(s_{t-1},h_{t-1})$, such that the recursion is finite such that for t=0, $h_t = h_0$ and $h_0$ is defined to take a value in E,
   (f.) Computing a functional composition of the v sub-policies $\{\pi^{m,i}_t\}$, i=1,2, ... ,v, and the v-dimensional recursive mixing function $g^m(s_t, h_t)$, given the stimulus $s_t$ and the previous mixing value $h_t$,
      whereby the plurality of v sub-policies can be subsequently combined according to said mixture distributions.

19. The article of claim 18 further specifying:
   (a.) Specifying a nonrecursive mixing function $g^f$: S→E, such that for the stimulus $s_t \in S$, $g^f(s_t) \in E$, where each dimension of said v-dimensional $g^f(\cdot,\cdot)$ is denoted by $g^f_i(\cdot,\cdot)$, i=1,2, ... ,v,
   (a.) Computing a linear weighted sum of the v sub-policies:

$$\pi^m_i(s_t,a) = \Sigma_{1 \leq i \leq v}(\pi^{m,i}_t(s_t,a) g^f_i(s_t)),$$

whereby said plurality of v sub-policies can be combined using said linear weighted sum.

20. The article of claim 18, further specifying a program of machine-readable instructions executable by a digital processing apparatus to perform method steps for combining policy information, the method steps comprising:
   (a.) Specifying a recursive mixing function $g^m$: S×E→E, such that for stimulus $s_t \in S$, and mixing value r∈E, $g^m(s_t,r) \in E$,
   (b.) Specifying a nonrecursive mixing function g: S→E, such that for stimulus $s_t \in S$, $g(s_t) \in E$,
   (c.) Specifying a value of the mixing function at the previous time step t−1 represented by the recursive function $h_t = g^m(s_{t-1},h_{t-1})$, such that the recursion is finite such that $h_0$ is defined to take a value in E,
   (d.) Specifying at time t a scalar value x∈I and a scalar value y=1−x,
   (e.) Specifying a function $q_t$: $E^t$→E such that $q_t(h_t, h_{t-1}, h_{t-1}, \ldots, h_1) \in E$, (f.) Computing a recursive update function such that given stimulus $s_t \in S$ at time t, $$g^m(s_t, h_t) = x\ g(s_t) + y\ q_t(h_t, h_{t-1}, h_{t-1}, \ldots, h_t),$$

whereby the mixing function can smoothly transition over time, whereby the mixing function can exhibit a dependency upon previous values of the mixing function, whereby the mixing function can allow (but does not require) the effect of temporal persistence upon the mixing function depending upon selection of parameter x and function $q_t$ for given t.

21. The medium recited in claim 20 further specifying (a.) Computing a moving average update of the mixing function such that given stimulus $s_t \in S$ at time t, $$g^m(s_t, h_t) = x\ g(s_t)) + y\ h_t,$$

whereby the mixing function can smoothly transition over time, whereby the mixing function can have a moving average dependency upon previous values of the mixing function, whereby the mixing function can allow (but does not require) the effect of temporal persistence upon the mixing function depending upon selection of parameter x.

22. The article of claim 18 wherein computing the functional composition of the v sub-policies $\{\pi^{m,i}_t\}$, i=1,2, . . . ,v, and the v-dimensional recursive mixing function $g^m(s_t, h^t)$, given the stimulus $s_t$ and the previous mixing value $h_t$ according to the following:

$$\pi^m_i(s_t, a) = f(g^m(s_t, h_t), \{\pi^{m,i}_t(s_t, a)\}, i=1,2, \ldots, v),$$

whereby the plurality of v sub-policies can be combined via a possibly nonlinear functional composition and allowing although not requiring the effect of temporal persistence depending upon previous values of the mixing function.

23. The article of claim 22 further specifying (a.) A linear weighted sum of the v sub-policies:

$$\pi^m_i(s_t, a) = \Sigma_{1 \leq i \leq v}(\pi^{m,i}_t(s_t, a)\ g^m_i(s_t, h_t)),$$

whereby said plurality of v sub-policies can be combined using said linear weighted sum and incorporating the effect of recursive temporal persistence allowing the current mixing value to depend upon previous values of the mixing function.

24. A method of combining a plurality of input value functions, comprising:

(a.) providing an input information transmitting device representing an input control stimulus, (b.) providing an input information transmitting device representing a plurality of input value functions, (c.) providing an output information transmitting device representing an output value function, (d.) combining said input value functions into said output value function, such that more than one said input value function may simultaneously influence said output value function for said input control stimulus, (e.) transmitting said output value function via said output information transmitting device, whereby said method will combine said input value function by functional composition to obtain a single output value function, whereby more than one said input value function are able to simultaneously influence the said output value function for the said input control stimulus, whereby said method can iterate over time, whereby said method will allow said output value function to smoothly transition control from being influenced substantially by one of said input value functions to being influenced by substantially another of said input value functions, whereby said method will allow said output value function to smoothly transition control from being influenced substantially by one particular functional composition of said input value functions to being influenced substantially by another functional composition of said input value functions, whereby said method will allow the combination of a plurality of input value functions for the purpose of consolidating that information into a form suitable for use by a policy-based "action selection executive" (i.e., a policy-based "controller") that is able to convert a value function into a control policy, and then use that control policy to automate the execution of action selection.

* * * * *